(12) United States Patent
Takata et al.

(10) Patent No.: US 11,791,105 B2
(45) Date of Patent: Oct. 17, 2023

(54) SOLID ELECTROLYTIC CAPACITOR

(71) Applicant: TOKIN CORPORATION, Sendai (JP)

(72) Inventors: Hitoshi Takata, Sendai (JP); Masami Ishijima, Sendai (JP); Satoshi Abe, Sendai (JP); Kazuaki Saito, Sendai (JP)

(73) Assignee: TOKIN CORPORATION, Miyagi (JP)

( * ) Notice: Subject to any disclaimer, the term of this patent is extended or adjusted under 35 U.S.C. 154(b) by 0 days.

(21) Appl. No.: 17/719,487

(22) Filed: Apr. 13, 2022

(65) Prior Publication Data

US 2022/0336159 A1    Oct. 20, 2022

(30) Foreign Application Priority Data

Apr. 14, 2021   (JP) .................................. 2021-068223

(51) Int. Cl.
*H01G 9/012*   (2006.01)
*H01G 9/15*    (2006.01)
*H01G 9/10*    (2006.01)

(52) U.S. Cl.
CPC .............. *H01G 9/012* (2013.01); *H01G 9/10* (2013.01); *H01G 9/15* (2013.01)

(58) Field of Classification Search
CPC ................................. H01G 9/15; H01G 9/012
See application file for complete search history.

(56) References Cited

U.S. PATENT DOCUMENTS

| 4,282,645 A | * | 8/1981 | Thompson | .............. | H01G 9/012 |
| | | | | | 29/25.03 |
| 8,289,678 B2 | | 10/2012 | Kim et al. | | |
| 2010/0177463 A1 | * | 7/2010 | Kurokawa | .............. | H01G 9/012 |
| | | | | | 29/25.03 |

FOREIGN PATENT DOCUMENTS

| JP | S5476957 A | | 6/1979 | | |
| JP | H0281029 U | | 6/1990 | | |
| JP | 05343271 A | * | 12/1993 | | |
| JP | 2006216680 A | * | 8/2006 | ............. | H01G 9/012 |
| JP | 2006237195 A | | 9/2006 | | |
| JP | 2006310776 A | * | 11/2006 | ............. | H01G 9/012 |
| JP | 2009302499 A | | 12/2009 | | |

(Continued)

OTHER PUBLICATIONS

Japanese Office Action (and English language translation thereof) dated Sep. 15, 2021, issued in counterpart Japanese Application No. 2021-068223.

*Primary Examiner* — Eric W Thomas
(74) *Attorney, Agent, or Firm* — Holtz, Holtz & Volek PC

(57) ABSTRACT

A solid electrolytic capacitor includes a capacitor element, an outer anode terminal, an outer cathode terminal and an outer mold. The capacitor element has an anode lead wire, an anode body and a cathode layer. The capacitor element has an upper surface and a lower surface in an up-down direction. The outer cathode terminal and the outer anode terminal are positioned away from each other in a predetermined direction perpendicular to the up-down direction. The outer cathode terminal has an upper portion, a lower portion and a connecting portion. One of the upper portion and the lower portion is longer than a remaining one of the upper portion and the lower portion in the predetermined direction. The outer mold covers the capacitor element so that each of the outer anode terminal and the outer cathode terminal is partially exposed to an outside of the solid electrolytic capacitor.

17 Claims, 15 Drawing Sheets

(56) References Cited

FOREIGN PATENT DOCUMENTS

| JP | 2012230990 A | 11/2012 |
| JP | 2019153631 A | 9/2019 |

\* cited by examiner

US 11,791,105 B2

SOLID ELECTROLYTIC CAPACITOR

CROSS REFERENCE TO RELATED APPLICATIONS

This application is based on and claims priority under 35 U.S.C. § 119 to Japanese Patent Application No. JP2021-068223 filed Apr. 14, 2021, the contents of which are incorporated herein in their entirety by reference.

BACKGROUND OF THE INVENTION

This invention relates to a solid electrolytic capacitor comprising a capacitor element and an outer cathode terminal.

Patent Document 1 (JPA S54-76957) discloses a solid electrolytic capacitor 900 of this type. As shown in FIGS. 29 and 30, the solid electrolytic capacitor 900 of Patent Document 1 comprises a capacitor element 910, an outer mold 970, an outer anode terminal 920 and an outer cathode terminal 950. The capacitor element 910 has an anode lead wire 912 and a cathode layer 914. The capacitor element 910 has an upper surface 916 and a lower surface 918 in a Z-direction. The outer mold 970 covers the capacitor element 910. The outer anode terminal 920 is connected with the anode lead wire 912. The outer cathode terminal 950 is connected with the cathode layer 914. The outer cathode terminal 950 and the outer anode terminal 920 are positioned away from each other in an X-direction. The outer cathode terminal 950 has an upper portion 952, a lower portion 954 and a connecting portion 956. The upper portion 952 is positioned beyond the upper surface 916 of the capacitor element 910 in a positive Z-direction of the Z-direction. The lower portion 954 is positioned beyond the lower surface 918 of the capacitor element 910 in a negative Z-direction of the Z-direction. The connecting portion 956 connects the lower portion 954 and the upper portion 952 with each other.

The solid electrolytic capacitor 900 of Patent Document 1 is configured so that the outer cathode terminal 950 sandwiches the capacitor element 910.

SUMMARY OF THE INVENTION

It is therefore an object of the present invention to provide a solid electrolytic capacitor with a structure which enables thinning of the solid electrolytic capacitor.

One aspect of the present invention provides a solid electrolytic capacitor comprising a capacitor element, an outer anode terminal, an outer cathode terminal and an outer mold. The capacitor element has an anode lead wire, an anode body and a cathode layer. The capacitor element has an upper surface and a lower surface in an up-down direction. The outer anode terminal is connected with the anode lead wire. The outer cathode terminal is connected with the cathode layer. The outer cathode terminal and the outer anode terminal are positioned away from each other in a predetermined direction perpendicular to the up-down direction. The outer cathode terminal has an upper portion, a lower portion and a connecting portion. The upper portion is positioned above the upper surface of the capacitor element in the up-down direction. The lower portion is positioned below the lower surface of the capacitor element in the up-down direction. The connecting portion connects the upper portion and the lower portion with each other. One of the upper portion and the lower portion is longer than a remaining one of the upper portion and the lower portion in the predetermined direction. The outer mold covers the capacitor element so that each of the outer anode terminal and the outer cathode terminal is partially exposed to an outside of the solid electrolytic capacitor.

The solid electrolytic capacitor 900 of the Patent Document 1 is configured so that the upper portion 952 and the lower portion 954 have the same size in the X-direction. In such a case, the thinner the capacitor element 910 is, the more difficult it is to insert the capacitor element 910 into a gap between the upper portion 952 and the lower portion 954 which are placed close together in the Z-direction. In contrast, the solid electrolytic capacitor of the present invention is configured so that the one of the upper portion and the lower portion is longer than the remaining one of the upper portion and the lower portion in the predetermined direction. Thus, in the solid electrolytic capacitor of the present invention, the capacitor element with reduced thickness can be easily and properly inserted into a gap between the upper portion and the lower portion of the outer cathode terminal in the following manner: the capacitor element is brought into contact with the one of the upper portion and the lower portion which is longer than the remaining one of the upper portion and the lower portion in the predetermined direction; and the capacitor element is then slid into the outer cathode terminal in the predetermined direction. In other words, the solid electrolytic capacitor of the present invention has a structure which enables thinning of the solid electrolytic capacitor.

An appreciation of the objectives of the present invention and a more complete understanding of its structure may be had by studying the following description of the preferred embodiment and by referring to the accompanying drawings.

Figure 1:
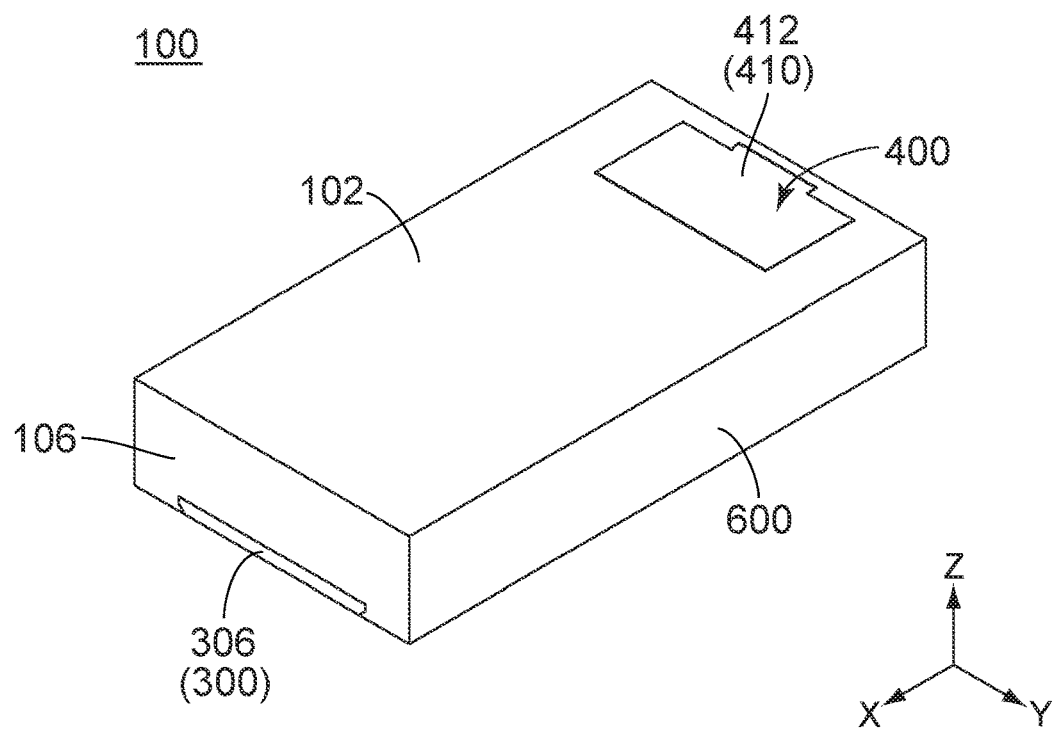
FIG. 1 is an upper, perspective view showing a solid electrolytic capacitor according to a first embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

First Embodiment

Figure 2:
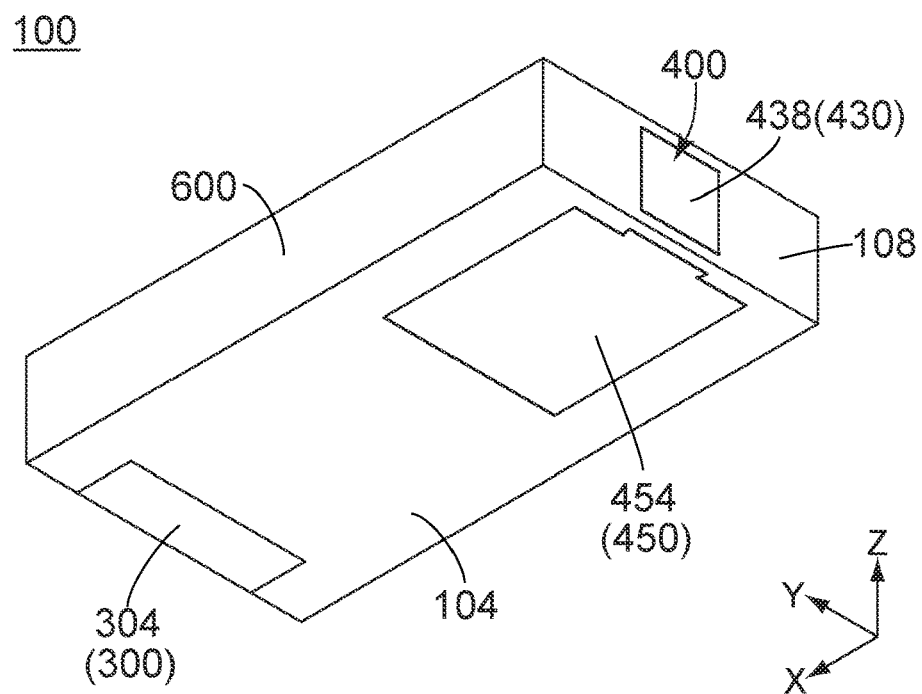
FIG. 2 is a lower, perspective view showing the solid electrolytic capacitor of FIG. 1.

As shown in FIGS. 1 and 2, a solid electrolytic capacitor 100 according to a first embodiment of the present invention has an upper surface 102 and a lower surface 104 in an up-down direction. In the present embodiment, the up-down direction is a Z-direction. Specifically, upward is a positive Z-direction while downward is a negative Z-direction. The solid electrolytic capacitor 100 has a front surface 106 and a rear surface 108 in a front-rear direction perpendicular to the up-down direction. In the present embodiment, the front-rear direction is an X-direction. Specifically, forward is a positive X-direction while rearward is a negative X-direction. In addition, the front-rear direction is also referred to as a predetermined direction.

Figure 4:
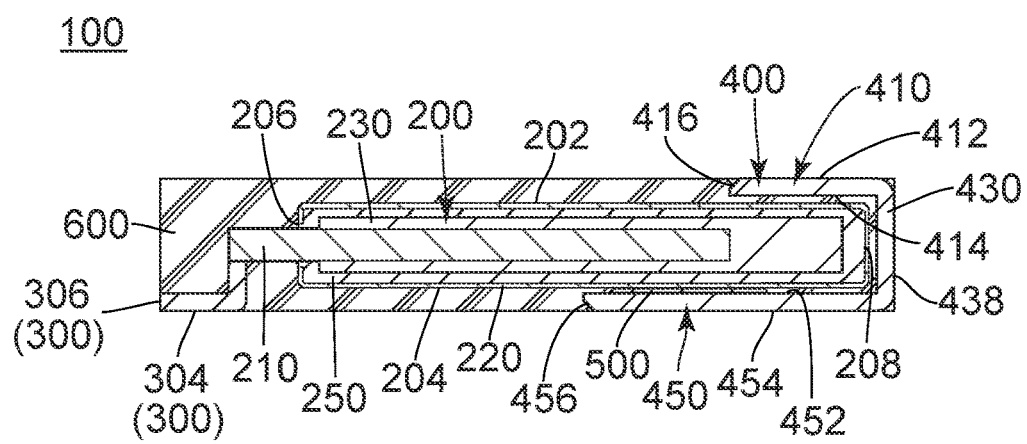
FIG. 4 is a cross-sectional view showing the solid electrolytic capacitor of FIG. 3, taken along line A-A.

As shown in FIG. 4, the solid electrolytic capacitor 100 comprises a capacitor element 200, an outer anode terminal 300, an outer cathode terminal 400 and an outer mold 600.

As shown in FIG. 4, the capacitor element 200 of the present embodiment has an upper surface 202 and a lower surface 204 in the up-down direction. The capacitor element 200 has a front surface 206 and a rear surface 208 in the front-rear direction perpendicular to the up-down direction.

As shown in FIG. 4, the capacitor element 200 has an anode lead wire 210, an anode body 230, a dielectric layer 250 and a cathode layer 220.

Referring to FIG. 4, the anode lead wire 210 of the present embodiment is a tantalum wire and is partially embedded in the anode body 230. The anode lead wire 210 extends along the predetermined direction. The anode lead wire 210 is a flat wire. More specifically, the anode lead wire 210 has an oblong shaped cross-section in a plane perpendicular to the predetermined direction. However, the present invention is not limited thereto. Specifically, the cross-section of the anode lead wire 210 may have a substantially oblong shape, a substantially rectangular shape or a substantially rectangular shape with rounded corners.

Referring to FIG. 4, the anode lead wire 210 is welded to the outer anode terminal 300 by laser welding. In a general solid electrolytic capacitor, an anode lead wire is welded to an outer anode terminal by resistance welding. In a case where the anode lead wire is welded to the outer anode terminal by resistance welding, a connection portion of the anode lead wire and the outer anode terminal is required to have a certain length in the predetermined direction. In contrast, the solid electrolytic capacitor 100 of the present embodiment is configured so that the anode lead wire 210 is welded to the outer anode terminal 300 by laser welding. Accordingly, a connection portion of the anode lead wire 210 and the outer anode terminal 300 is not required to have a certain length in the predetermined direction. Thus, the capacitor element 200 itself can have a reduced size in the predetermined direction. In other words, the solid electrolytic capacitor 100 can have an increased volume which is occupied by the capacitor element 200 because the anode lead wire 210 is welded to the outer anode terminal 300 by laser welding.

As shown in FIG. 4, the anode lead wire 210 is positioned away from an outer surface of the outer mold 600. This prevents the anode lead wire 210 from being brought into contact with air or moisture which exists outside the solid electrolytic capacitor 100. In other words, the airtightness of the capacitor element 200 is improved.

Referring to FIG. 4, the anode body 230 of the present embodiment is preferably formed of a valve metal or a conductive oxide of a valve metal. Sintered tantalum powder is suitable for demonstration of the invention. The dielectric layer 250 is formed on an outer surface of the anode body 230.

As shown in FIG. 4, the cathode layer 220 of the present embodiment is formed on the dielectric layer 250. The cathode layer 220 comprises a solid electrolyte layer (not shown) and a conductive layer (not shown). However, the present invention is not limited thereto. The cathode layer 220 may have another structure, provided that the cathode layer 220 includes the solid electrolyte layer.

As shown in FIG. 4, the outer anode terminal 300 of the present embodiment is connected with the anode lead wire 210. A part of the outer anode terminal 300 is embedded into the outer mold 600. The outer anode terminal 300 has an L-shaped cross-section in a plane which is defined by the up-down direction and the predetermined direction. In other words, the outer anode terminal 300 has the L-shaped cross-section in the plane perpendicular to a width direction which is perpendicular to both the up-down direction and the front-rear direction. In the present embodiment, the width direction is a Y-direction. A conventional outer anode terminal with a flat plate shape tends to be easily removed from an outer mold, into which the outer anode terminal is embedded, due to its shape. In contrast, the outer anode terminal 300 of the present embodiment has the L-shaped cross-section in the plane perpendicular to the width direction as described above. Thus, as compared to a conventional outer anode terminal with a flat plate shape, the outer anode terminal 300 of the present embodiment is hardly removed from the outer mold 600 into which the outer anode terminal 300 is embedded.

Figure 5:
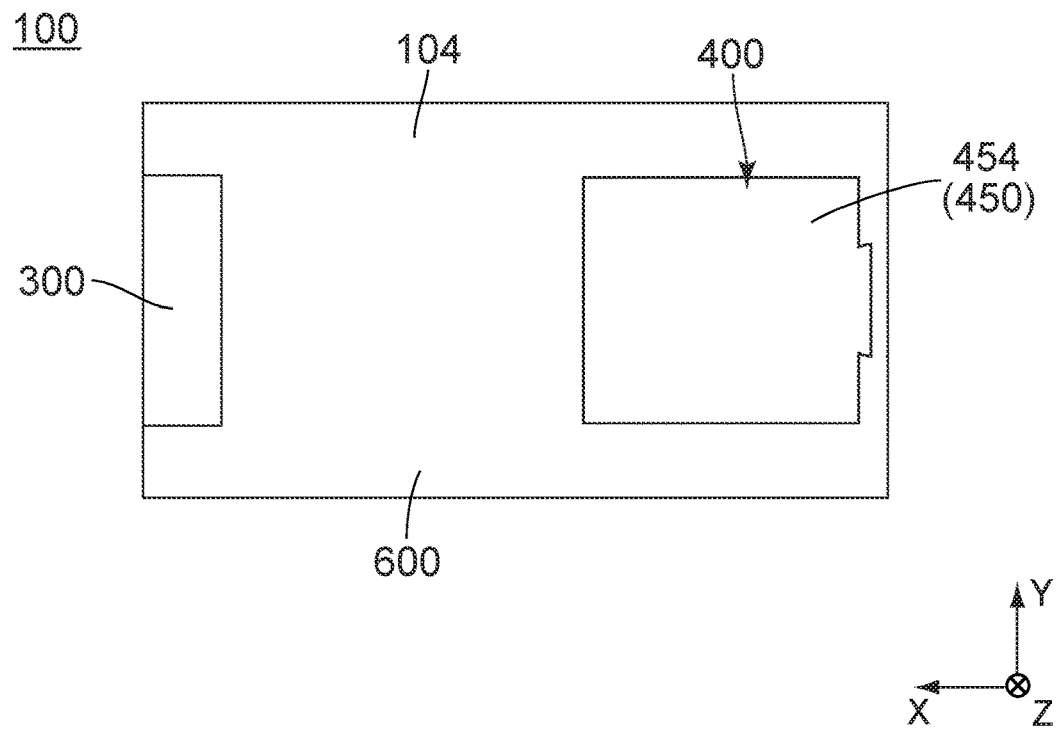
FIG. 5 is a bottom view showing the solid electrolytic capacitor of FIG. 1.

As shown in FIG. 5, a lower surface 304 of the outer anode terminal 300 is exposed to the outside of the solid electrolytic capacitor 100. The lower surface 304 of the outer anode terminal 300 is exposed on the lower surface 104 of the solid electrolytic capacitor 100. In other words, the lower surface 304 of the outer anode terminal 300 is not covered with the outer mold 600. As shown in FIG. 1, a front surface 306 of the outer anode terminal 300 is exposed to the outside of the solid electrolytic capacitor 100. The front surface 306 of the outer anode terminal 300 is exposed on the front surface 106 of the solid electrolytic capacitor 100. In other words, the front surface 306 of the outer anode terminal 300 is not covered with the outer mold 600. It is noted that the outer anode terminal 300 is not exposed on the upper surface 102 of the solid electrolytic capacitor 100.

Figure 9:
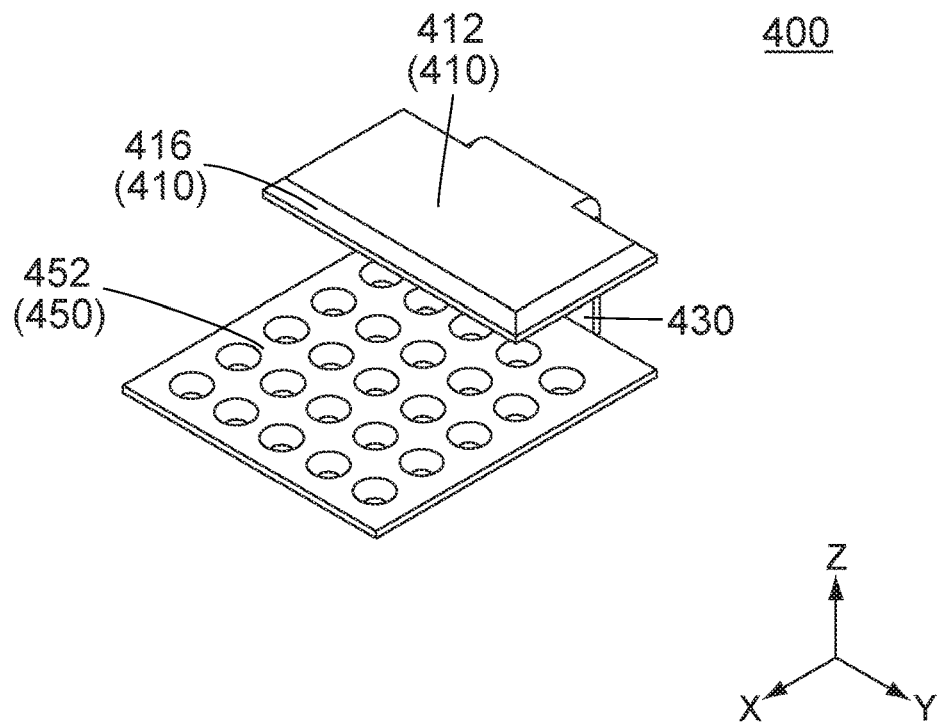
FIG. 9 is an upper, perspective view showing an outer cathode terminal which is included in the structure of FIG. 7.

Referring to FIG. 9, the outer cathode terminal 400 of the present embodiment is made of metal. As shown in FIG. 4, the outer cathode terminal 400 is connected with the cathode layer 220. The outer cathode terminal 400 and the outer anode terminal 300 are positioned away from each other in the predetermined direction perpendicular to the up-down direction.

Figure 7:
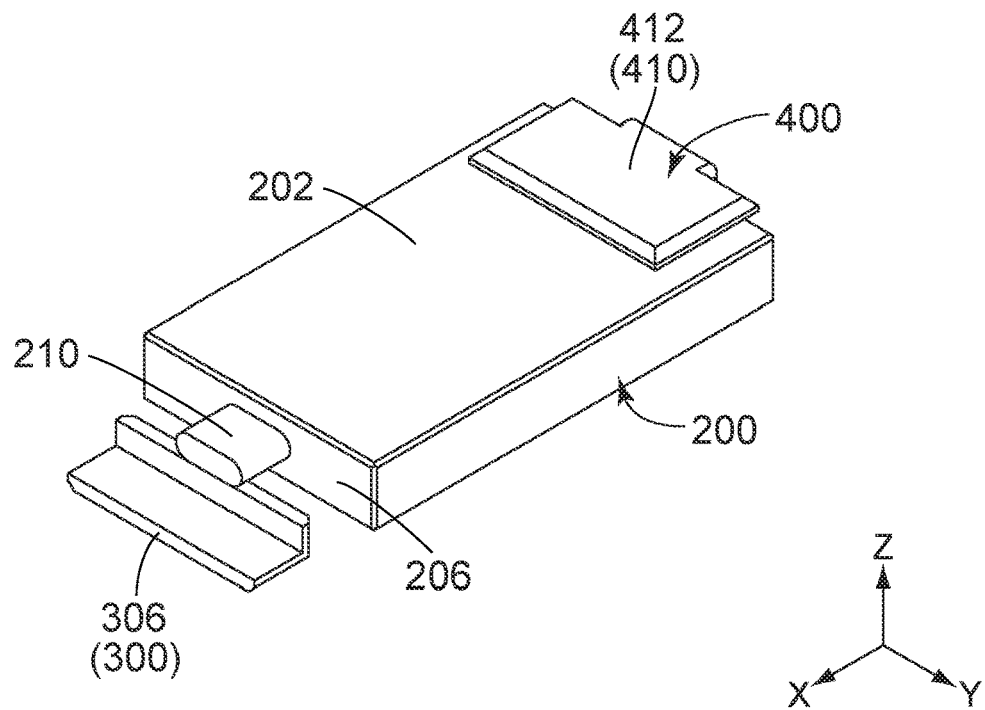
FIG. 7 is an upper, perspective view showing a structure of the solid electrolytic capacitor of FIG. 1, excluding an outer mold.
Figure 8:
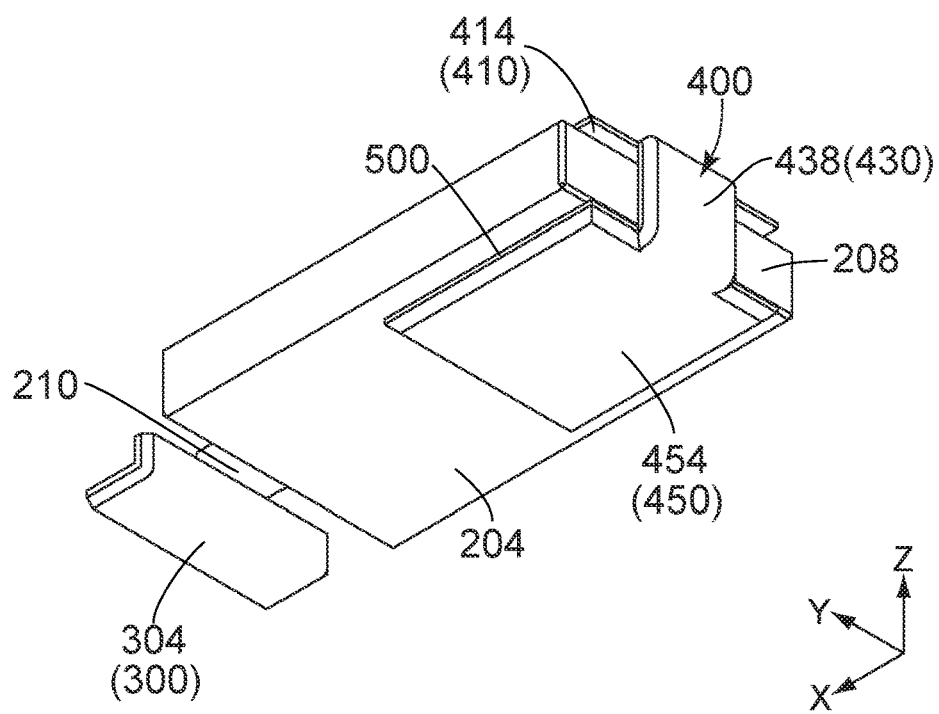
FIG. 8 is a lower, perspective view showing the structure of FIG. 7.

As shown in FIGS. 7 and 8, parts of rear corner portions of the capacitor element 200 are coved with the outer cathode terminal 400. As shown in FIG. 4, an upper end of the rear surface 208 of the capacitor element 200 is positioned inward of the outer cathode terminal 400 in the plane perpendicular to the width direction. A lower end of the rear surface 208 of the capacitor element 200 is positioned inward of the outer cathode terminal 400 in the plane perpendicular to the width direction.

In general, a conventional solid electrolytic capacitor may be molded by resin together with other electrical components after the solid electrolytic capacitor is mounted on a circuit board. Such a conventional solid electrolytic capacitor is protected by an outer mold. However, in such a conventional solid electrolytic capacitor, there is a probability that external force, which is generated when the resin is hardened for the molding of the conventional solid electrolytic capacitor, is applied to a capacitor element, in particular to its corner portions and thereby the capacitor element is degraded. In contrast, the solid electrolytic capacitor 100 of the present embodiment is, as described above, configured so that the parts of the rear corner portions of the capacitor element 200 are coved with the outer cathode terminal 400 made of metal. Thus, the solid electrolytic capacitor 100 of the present embodiment is configured so that the rear corner portions of the capacitor element 200 are protected from external force which is generated when resin is hardened for molding of the solid electrolytic capacitor 100 similar to the aforementioned molding.

Figure 10:
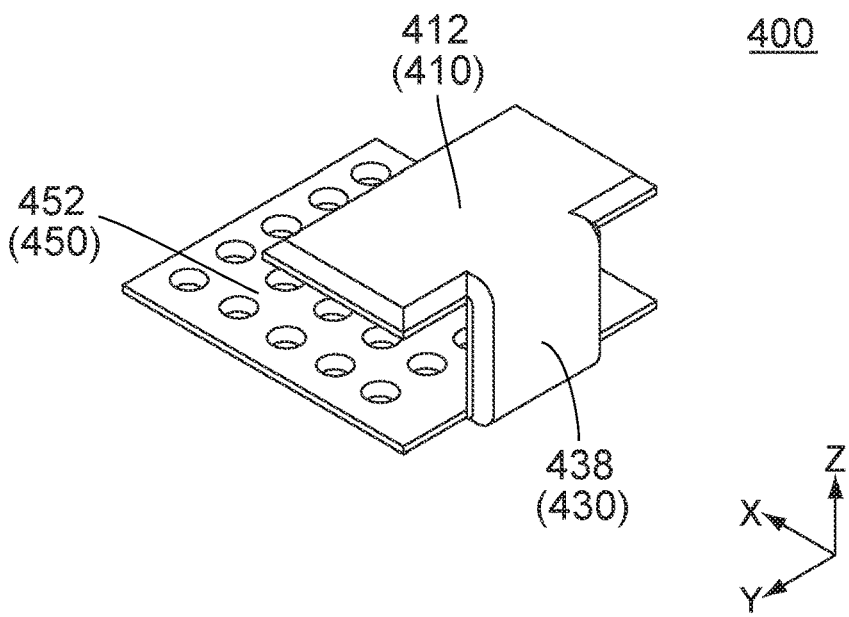
FIG. 10 is an upper, perspective view showing the outer cathode terminal of FIG. 9.
Figure 11:
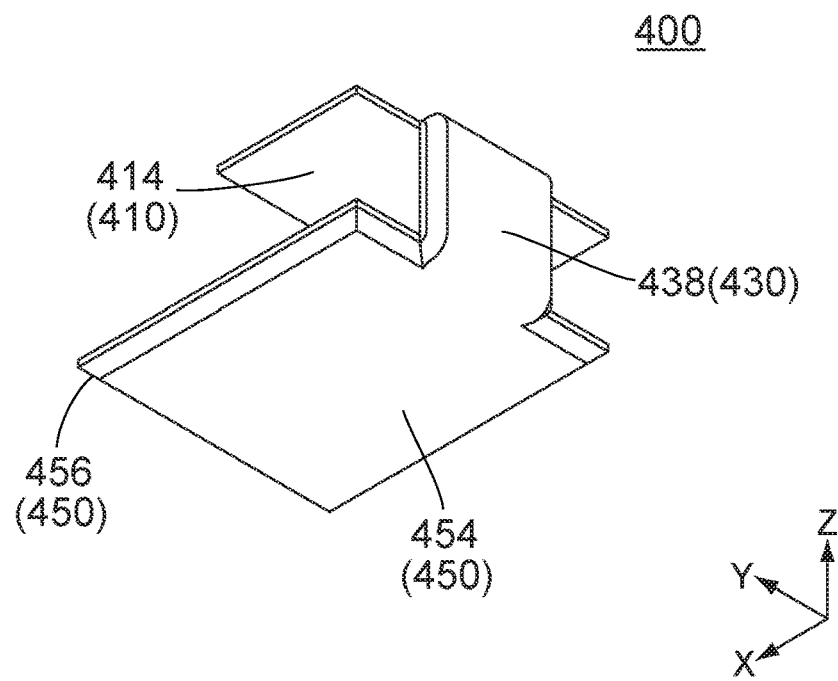
FIG. 11 is a lower, perspective view showing the outer cathode terminal of FIG. 9.

As shown in FIG. 10, the outer cathode terminal 400 has an upper portion 410, a lower portion 450 and a connecting portion 430.

As shown in FIG. 4, the upper portion 410 of the present embodiment has a flat plate shape perpendicular to the up-down direction. The upper portion 410 is positioned above the upper surface 202 of the capacitor element 200 in the up-down direction. The upper portion 410 covers the upper surface 202 of the capacitor element 200. The upper portion 410 has an upper surface 412 and a lower surface 414 in the up-down direction. The lower surface 414 of the upper portion 410 is larger than the upper surface 412 of the upper portion 410. Specifically, the upper portion 410 is configured so that the lower surface 414, which is positioned at a side of the upper portion 410 facing the capacitor element 200, has an area greater than an area of the upper surface 412 which is positioned at another side of the upper portion 410. This configuration enables the upper portion 410 to partially sink into the outer mold 600. Thus, the upper portion 410 is hardly removed from the outer mold 600.

As shown in FIG. 4, the upper portion 410 has an edge 416 in the predetermined direction, and the edge 416 is, at least in part, oblique to the predetermined direction. Specifically, an upper part of the edge 416 is oblique to the predetermined direction. However, the present embodiment is not limited thereto. The edge 416 may have any shape, including, but not limited, to an inclined shape or a staircase shape.

As shown in FIG. 4, the rear surface 208 of the capacitor element 200 is positioned below the upper portion 410 in the up-down direction. Specifically, the rear surface 208 of the capacitor element 200 is positioned below the lower surface 414 of the upper portion 410 in the up-down direction.

Figure 3:
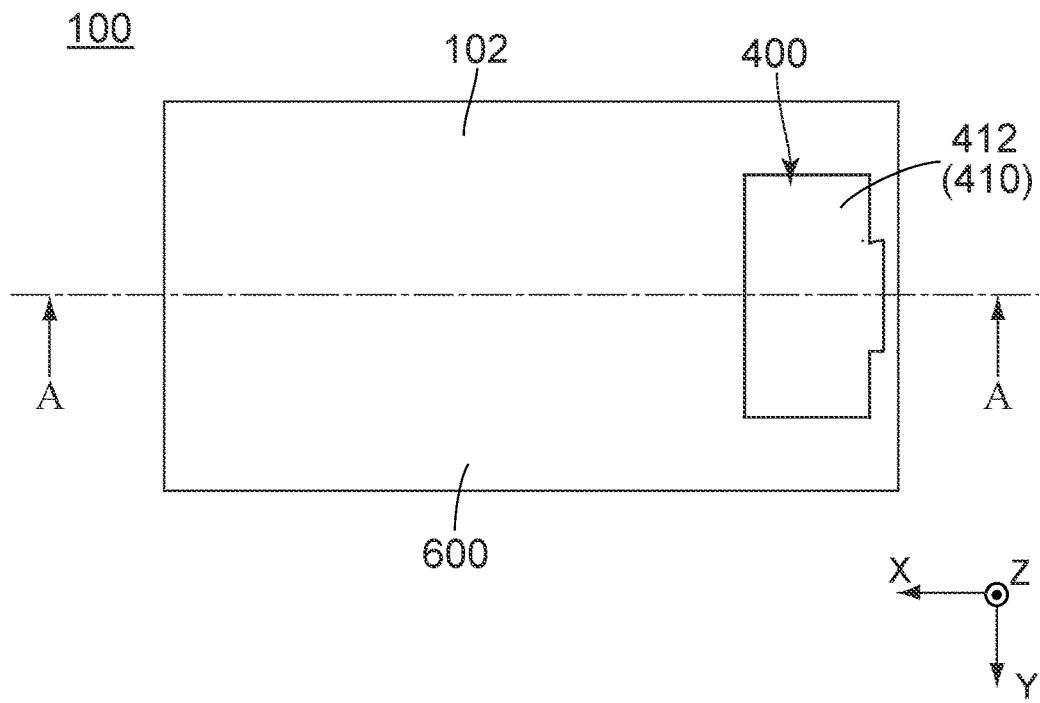
FIG. 3 is a top view showing the solid electrolytic capacitor of FIG. 1.

As shown in FIG. 3, the upper surface 412 of the upper portion 410 is exposed to the outside of the solid electrolytic capacitor 100. The upper surface 412 of the upper portion 410 is exposed on the upper surface 102 of the solid electrolytic capacitor 100. In other words, the upper surface 412 of the upper portion 410 is not covered with the outer mold 600. However, the present invention is not limited thereto. The upper surface 412 of the upper portion 410 may not be exposed to the outside of the solid electrolytic capacitor 100. In other words, the upper surface 412 of the upper portion 410 may be covered with the outer mold 600. However, the solid electrolytic capacitor 100 of the present embodiment is superior in that the upper surface 412 of the upper portion 410 is highly visible from the outside of the solid electrolytic capacitor 100. Thus, the solid electrolytic capacitor 100 of the present embodiment is more preferred.

As described above, the outer anode terminal 300 is not exposed on the upper surface 102 of the solid electrolytic capacitor 100 while the upper surface 412 of the upper portion 410 of the outer cathode terminal 400 is exposed to the outside of the solid electrolytic capacitor 100. In other words, conditions of exposure of the outer anode terminal 300 and the outer cathode terminal 400 from the outer mold 600 are different from each other. This facilitates identifications of the outer anode terminal 300 and the outer cathode terminal 400 from the outside of the solid electrolytic capacitor 100.

A problem exists in a small thin solid electrolytic capacitor in that, even if polarity designations are placed on the solid electrolytic capacitor, it is difficult for a person working in the field to visually inspect the polarity designations of the solid electrolytic capacitor due to its size. In contrast, the solid electrolytic capacitor 100 is configured so that the outer anode terminal 300 and the outer cathode terminal 400 are easily identified from the outside of the solid electrolytic capacitor 100 as described above. Thus, a person working in the field can easily identify polarities of the solid electrolytic capacitor 100 by visual inspection when the solid electrolytic capacitor 100 is mounted on a circuit board.

In general, ripple current flows through a solid electrolytic capacitor when ripple voltage is applied to the solid electrolytic capacitor upon usage of the solid electrolytic capacitor. This causes a capacitor element, which is included in the solid electrolytic capacitor, to generate heat. The generated heat might cause degradation of characteristics of the capacitor element included therein and might affect reliability of the solid electrolytic capacitor. Accordingly, temperature rise of a capacitor element, which is caused by its heat generation due to ripple current, must be reduced in a solid electrolytic capacitor. In the solid electrolytic capacitor 100 of the present embodiment, the upper surface 412 of the upper portion 410 is exposed to the outside of the solid electrolytic capacitor 100 as described above. This enables the solid electrolytic capacitor 100 of the present embodiment to provide increased heat dissipation as compared to a conventional solid electrolytic capacitor (for example, a solid electrolytic capacitor 800 shown in FIG. 28) whose outer cathode terminal is hardly exposed to the outside of its outer mold. Thus, in the solid electrolytic capacitor 100 of the present embodiment, temperature rise of the capacitor element 200, which is caused by its heat generation due to ripple current, is reduced and has little effect on reliability of the solid electrolytic capacitor 100.

As shown in FIG. 4, the lower portion 450 of the present embodiment has a flat plate shape perpendicular to the up-down direction. The lower portion 450 is positioned below the lower surface 204 of the capacitor element 200 in the up-down direction. The lower portion 450 covers the lower surface 204 of the capacitor element 200. The lower portion 450 has an upper surface 452 and a lower surface 454 in the up-down direction. The upper surface 452 of the lower portion 450 is larger than the lower surface 454 of the lower portion 450. Specifically, the lower portion 450 is configured so that the upper surface 452, which is positioned at a side of the lower portion 450 facing the capacitor element 200, has an area greater than an area of the lower surface 454 which is positioned at another side of the lower portion 450. This configuration enables the lower portion 450 to partially sink into the outer mold 600. Thus, the lower portion 450 is hardly removed from the outer mold 600.

As shown in FIG. 4, the lower portion 450 has an edge 456 in the predetermined direction, and the edge 456 is, at least in part, oblique to the predetermined direction. Specifically, a lower part of the edge 456 is oblique to the predetermined direction. However, the present embodiment is not limited thereto. The edge 456 may have any shape, including, but not limited to, an inclined shape or a staircase shape.

As shown in FIG. 4, the rear surface 208 of the capacitor element 200 is positioned above the lower portion 450 in the up-down direction. Specifically, the rear surface 208 of the capacitor element 200 is positioned above the upper surface 452 of the lower portion 450 in the up-down direction.

As shown in FIG. 5, the lower surface 454 of the lower portion 450 is exposed to the outside of the solid electrolytic capacitor 100. The lower surface 454 of the lower portion 450 is exposed on the lower surface 104 of the solid electrolytic capacitor 100. In other words, the lower surface 454 of the lower portion 450 is not covered with the outer mold 600.

In general, ripple current flows through a solid electrolytic capacitor when ripple voltage is applied to the solid electrolytic capacitor upon usage of the solid electrolytic capacitor. This causes a capacitor element, which is included in the solid electrolytic capacitor, to generate heat. The generated heat might cause degradation of characteristics of the capacitor element included therein and might affect reliability of the solid electrolytic capacitor. Accordingly, temperature rise of a capacitor element, which is caused by its heat generation due to ripple current, must be reduced in a solid electrolytic capacitor. In the solid electrolytic capacitor 100 of the present embodiment, the lower surface 454 of the lower portion 450 is exposed to the outside of the solid electrolytic capacitor 100 as described above. This enables the solid electrolytic capacitor 100 of the present embodiment to provide increased heat dissipation as compared to a conventional solid electrolytic capacitor (for example, the solid electrolytic capacitor 800 shown in FIG. 28) whose outer cathode terminal is hardly exposed to the outside of its outer mold. Thus, in the solid electrolytic capacitor 100 of the present embodiment, the temperature rise of the capacitor element 200, which is caused by its heat generation due to ripple current, is reduced and has little effect on the reliability of the solid electrolytic capacitor 100.

As shown in FIG. 4, the outer cathode terminal 400 of the present embodiment is configured so that the lower portion 450 is longer than the upper portion 410 in the predetermined direction. However, the present invention is not limited thereto. Specifically, one of the upper portion 410 and the lower portion 450 should be longer than a remaining one of the upper portion 410 and the lower portion 450 in the predetermined direction. Thus, in the solid electrolytic capacitor 100, the capacitor element 200 with reduced thickness can be easily and properly inserted into a gap between the upper portion 410 and the lower portion 450 of the outer cathode terminal 400 in the following manner: the capacitor element 200 is brought into contact with the one of the upper portion 410 and the lower portion 450 which is longer than the remaining one of the upper portion 410 and the lower portion 450 in the predetermined direction; and the capacitor element 200 is then slid into the outer cathode terminal 400 in the predetermined direction. In other words, the solid electrolytic capacitor 100 has a structure which enables thinning of the solid electrolytic capacitor 100.

As shown in FIG. 9, the upper surface 452 of the lower portion 450 is formed with irregularities.

As shown in FIG. 4, the lower portion 450 and the cathode layer 220 are connected with each other by conductive adhesive 500. As described above, the upper surface 452 of the lower portion 450 is formed with the irregularities. This enables the upper surface 452 to have a large area of contact with the conductive adhesive 500.

As shown in FIG. 10, the connecting portion 430 of the present embodiment extends in the up-down direction. The connecting portion 430 connects the upper portion 410 and the lower portion 450 with each other. Specifically, the connecting portion 430 connects the upper portion 410 and the lower portion 450 with each other in the up-down direction. The connecting portion 430 has a size smaller than a size of any of the upper portion 410 the lower portion 450 in the width direction perpendicular to both the up-down direction and the predetermined direction. This facilitates bending of the connecting portion 430.

As shown in FIG. 4, the rear surface 208 of the capacitor element 200 is positioned forward of the connecting portion 430 in the front-rear direction. The connecting portion 430 covers the rear surface 208 of the capacitor element 200.

Figure 6:
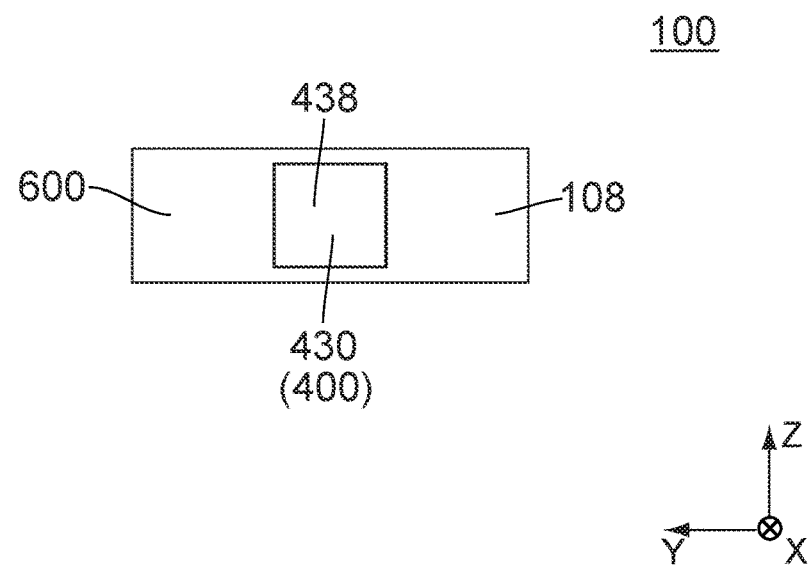
FIG. 6 is a rear view showing the solid electrolytic capacitor of FIG. 1.

As shown in FIG. 6, a part of the rear surface 438 of the connecting portion 430 is exposed to the outside of the solid electrolytic capacitor 100. Specifically, the part of the rear surface 438 of the connecting portion 430 is exposed on the rear surface 108 of the solid electrolytic capacitor 100. In other words, the part of the rear surface 438 of the connecting portion 430 is not covered with the outer mold 600.

In general, ripple current flows through a solid electrolytic capacitor when ripple voltage is applied to the solid electrolytic capacitor upon usage of the solid electrolytic capacitor. This causes a capacitor element, which is included in the solid electrolytic capacitor, to generate heat. The generated heat might cause degradation of characteristics of the capacitor element included therein and might affect reliability of the solid electrolytic capacitor. Accordingly, temperature rise of a capacitor element, which is caused by its heat generation due to ripple current, must be reduced in a solid electrolytic capacitor. The solid electrolytic capacitor 100 of the present embodiment is configured so that the part of the rear surface 438 of the connecting portion 430 is exposed to the outside of the solid electrolytic capacitor 100 as described above. This enables the solid electrolytic capacitor 100 of the present embodiment to provide increased heat dissipation as compared to a conventional solid electrolytic capacitor (for example, the solid electrolytic capacitor 800 shown in FIG. 28) whose outer cathode terminal is hardly exposed to the outside of its outer mold. Thus, in the solid electrolytic capacitor 100 of the present embodiment, the temperature rise of the capacitor element 200, which is caused by its heat generation due to ripple current, is reduced and has little effect on the reliability of the solid electrolytic capacitor 100.

In particular, the solid electrolytic capacitor 100 of the present embodiment is, as described above, configured as follows: the upper portion 410 covers the upper surface 202 of the capacitor element 200; the lower portion 450 covers the lower surface 204 of the capacitor element 200; the connecting portion 430 covers the rear surface 208 of the capacitor element 200; and each of the upper surface 412 of the upper portion 410, the lower surface 454 of the lower portion 450 and the part of the rear surface 438 of the connecting portion 430 is exposed to the outside of the solid electrolytic capacitor 100. A conventional solid electrolytic capacitor is configured so that an outer cathode terminal with a flat plate shape coves only a lower surface of a capacitor element while only a lower surface of the outer cathode terminal is exposed to the outside of the conventional solid electrolytic capacitor. In contrast, as compared to such a conventional solid electrolytic capacitor, the solid electrolytic capacitor 100 of the present embodiment is configured so that the outer cathode terminal 400 has a large area covering the capacitor element 200 while each of the upper surface 412 of the upper portion 410 and the part of the rear surface 438 of the connecting portion 430 is exposed to the outside of the solid electrolytic capacitor 100 in addition to the exposure of the lower surface 454 thereto. This enables the solid electrolytic capacitor 100 of the present embodiment to provide further increased heat dissipation as compared to a conventional solid electrolytic capacitor. Thus, in the solid electrolytic capacitor 100 of the present embodiment, the temperature rise of the capacitor element 200, which is caused by its heat generation due to ripple current, is further reduced and has still little effect on the reliability of the solid electrolytic capacitor 100.

As shown in FIGS. 1, 2 and 4, the outer mold 600 of the present embodiment covers the capacitor element 200 so that each of the outer anode terminal 300 and the outer cathode terminal 400 is partially exposed to the outside of the solid electrolytic capacitor 100.

Second Embodiment

Figure 12:
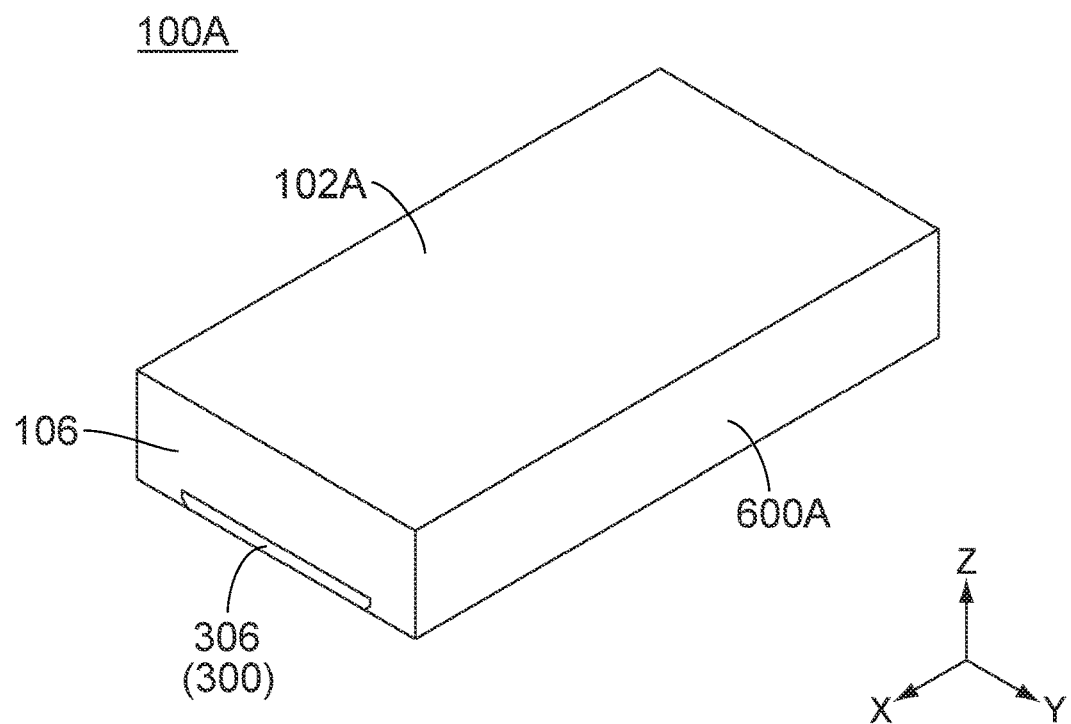
FIG. 12 is an upper, perspective view showing a solid electrolytic capacitor according to a second embodiment of the present invention.
Figure 13:
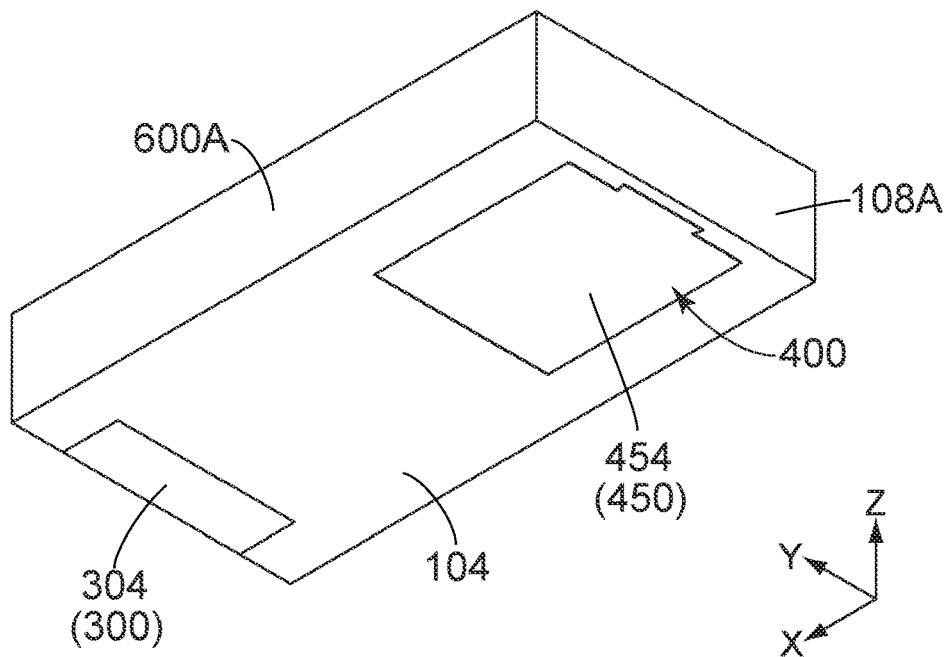
FIG. 13 is a lower, perspective view showing the solid electrolytic capacitor of FIG. 12.

As shown in FIGS. 12 and 13, a solid electrolytic capacitor 100A according to a second embodiment of the present invention has an upper surface 102A and a lower surface 104 in the up-down direction. The solid electrolytic capacitor 100A has a front surface 106 and a rear surface 108A in the front-rear direction perpendicular to the up-down direction. Referring to FIG. 12, the solid electrolytic capacitor 100A comprises a capacitor element (not shown), an outer anode terminal 300, an outer cathode terminal 400 and an outer mold 600A. The solid electrolytic capacitor 100A has a structure similar to that of the solid electrolytic capacitor 100 of the first embodiment except for the outer mold 600A. Accordingly, components similar to those of the first embodiment among components of the second embodiment will be designated by the same reference numerals as those of the first embodiment, and a detail explanation thereabout will be omitted. As for directions and orientations in the present embodiment, expressions same as those of the first embodiment will be used hereinbelow.

As shown in FIG. 13, a lower surface 304 of the outer anode terminal 300 is exposed to the outside of the solid electrolytic capacitor 100A. The lower surface 304 of the outer anode terminal 300 is exposed on the lower surface 104 of the solid electrolytic capacitor 100A. In other words, the lower surface 304 of the outer anode terminal 300 is not covered with the outer mold 600A. As shown in FIG. 12, a front surface 306 of the outer anode terminal 300 is exposed to the outside of the solid electrolytic capacitor 100A. The front surface 306 of the outer anode terminal 300 is exposed on the front surface 106 of the solid electrolytic capacitor 100A. In other words, the front surface 306 of the outer anode terminal 300 is not covered with the outer mold 600A. It is noted that the outer anode terminal 300 is not exposed on the upper surface 102A of the solid electrolytic capacitor 100.

Figure 14:
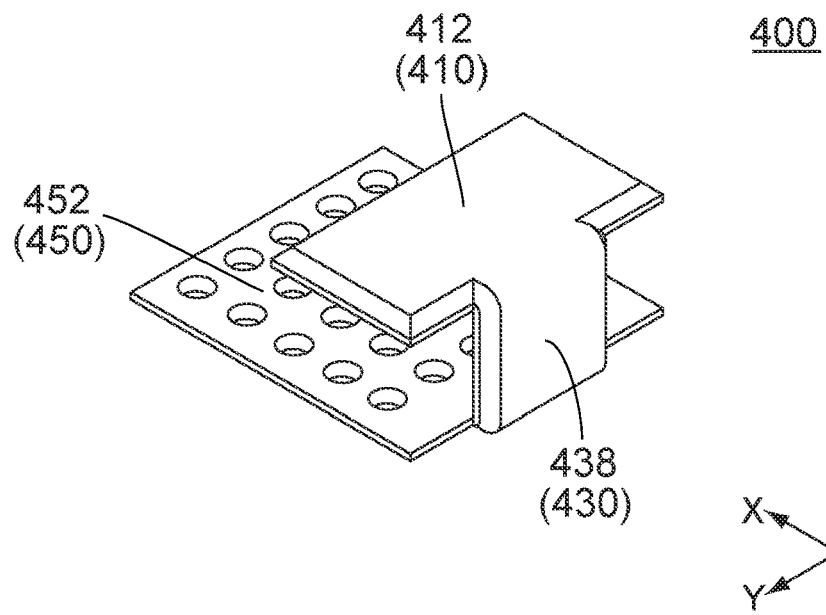
FIG. 14 is an upper, perspective view showing an outer cathode terminal which is included in the solid electrolytic capacitor of FIG. 12.

Referring to FIGS. 12 and 14, an upper portion 410 of the outer cathode terminal 400 covers an upper surface (not shown) of the capacitor element. An upper surface 412 of the upper portion 410 is not exposed to the outside of the solid electrolytic capacitor 100A. The upper surface 412 of the upper portion 410 is not exposed on the upper surface 102A of the solid electrolytic capacitor 100A. Specifically, the upper surface 412 of the upper portion 410 is thinly covered with the outer mold 600A.

As shown in FIG. 13, a lower portion 450 of the outer cathode terminal 400 covers a lower surface (not shown) of the capacitor element. A lower surface 454 of the lower portion 450 is exposed to the outside of the solid electrolytic capacitor 100A. The lower surface 454 of the lower portion 450 is exposed on the lower surface 104 of the solid electrolytic capacitor 100A. In other words, the lower surface 454 of the lower portion 450 is not covered with the outer mold 600A.

Referring to FIGS. 13 and 14, a connecting portion 430 of the outer cathode terminal 400 covers a rear surface (not shown) of the capacitor element. A rear surface 438 of the connecting portion 430 is not exposed to the outside of the solid electrolytic capacitor 100A. The rear surface 438 of the connecting portion 430 is not exposed on the rear surface 108A of the solid electrolytic capacitor 100A. Specifically, the rear surface 438 of the connecting portion 430 is thinly covered with the outer mold 600A.

The solid electrolytic capacitor 100A of the present embodiment is, as described above, configured as follows: the upper portion 410 covers the upper surface of the capacitor element; the lower portion 450 covers the lower surface of the capacitor element; the connecting portion 430 covers the rear surface of the capacitor element; and the lower surface 454 of the lower portion 450 is exposed to the outside of the solid electrolytic capacitor 100A. A conventional solid electrolytic capacitor is configured so that an outer cathode terminal with a flat plate shape coves only a lower surface of a capacitor element while only a lower surface of the outer cathode terminal is exposed to the outside of the conventional solid electrolytic capacitor. In contrast, as compared to such a conventional solid electrolytic capacitor, the solid electrolytic capacitor 100A of the present embodiment is configured so that the outer cathode terminal 400 has a large area covering the capacitor element. This enables the solid electrolytic capacitor 100A of the present embodiment to provide increased heat dissipation as compared to a conventional solid electrolytic capacitor. Thus, in the solid electrolytic capacitor 100A of the present embodiment, temperature rise of the capacitor element, which is caused by its heat generation due to ripple current, is reduced and has little effect on reliability of the solid electrolytic capacitor 100A.

Referring to FIGS. 12 and 13, the outer mold 600A of the present embodiment covers the capacitor element so that each of the outer anode terminal 300 and the outer cathode terminal 400 is partially exposed to the outside of the solid electrolytic capacitor 100A.

Third Embodiment

Figure 15:
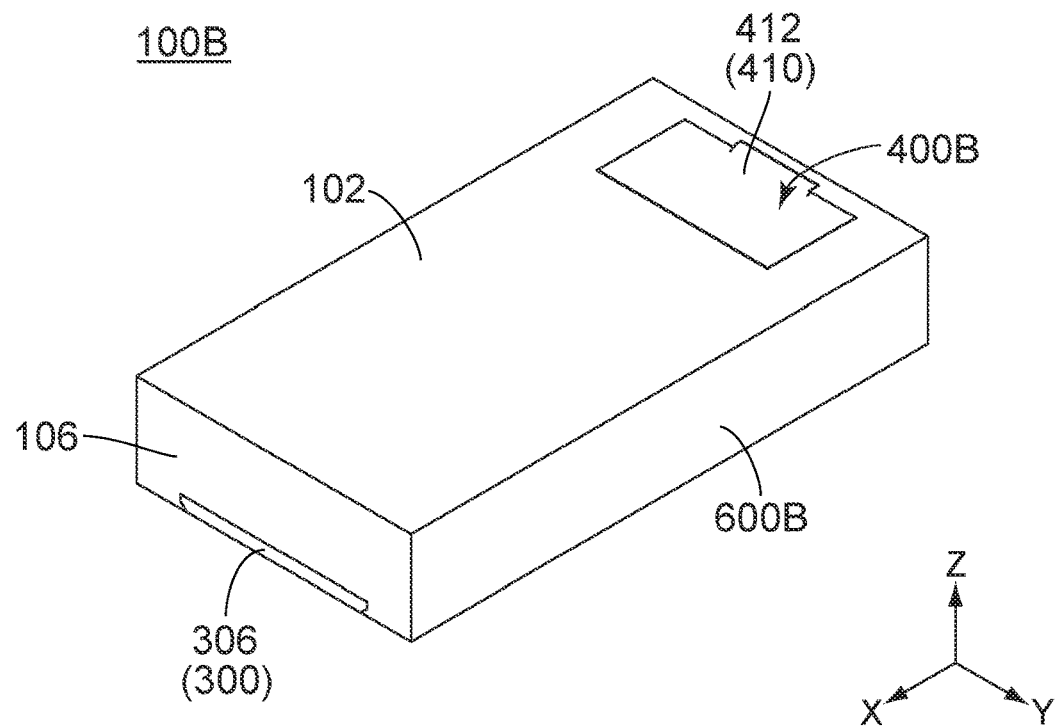
FIG. 15 is an upper, perspective view showing a solid electrolytic capacitor according to a third embodiment of the present invention.
Figure 16:
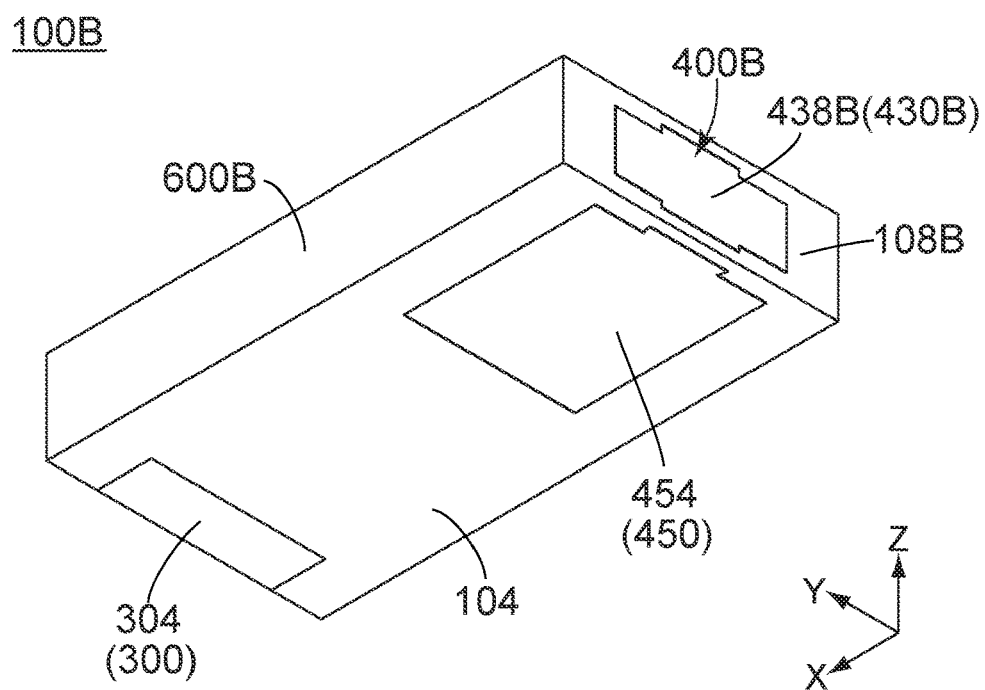
FIG. 16 is a lower, perspective view showing the solid electrolytic capacitor of FIG. 15.
Figure 17:
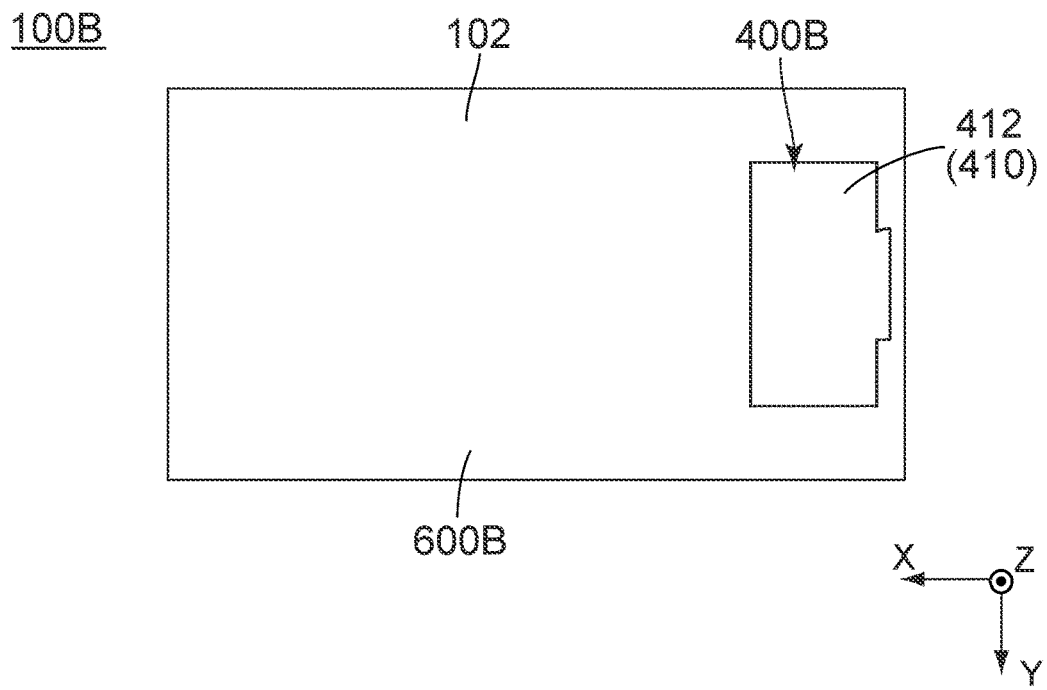
FIG. 17 is a top view showing the solid electrolytic capacitor of FIG. 15.
Figure 18:
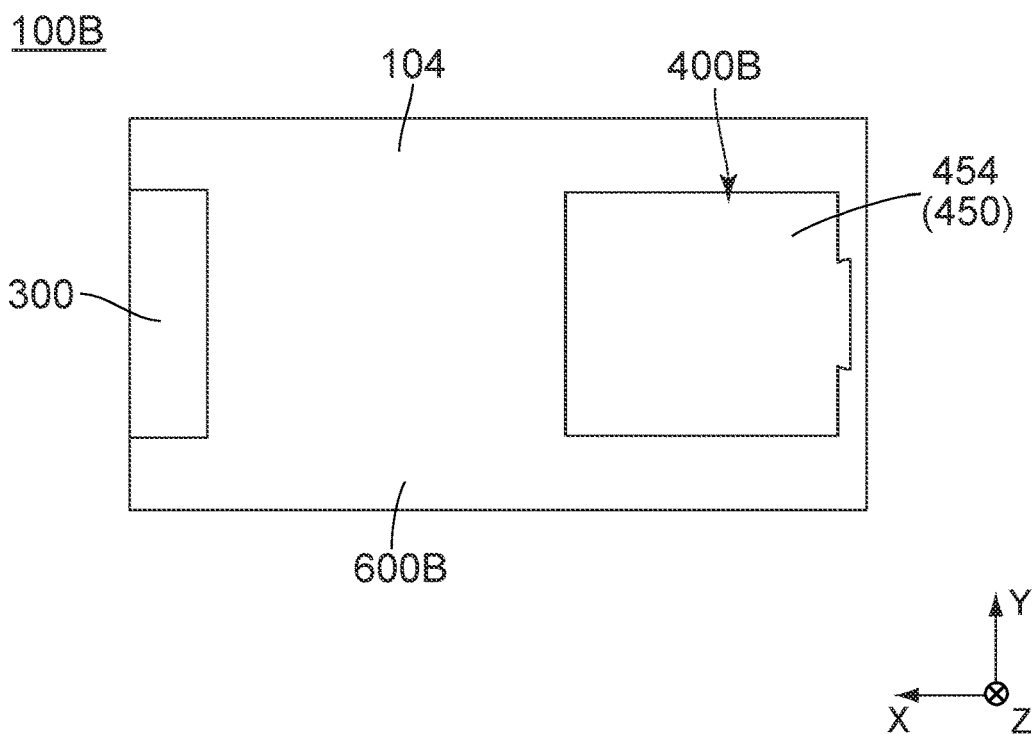
FIG. 18 is a bottom view showing the solid electrolytic capacitor of FIG. 15.
Figure 20:
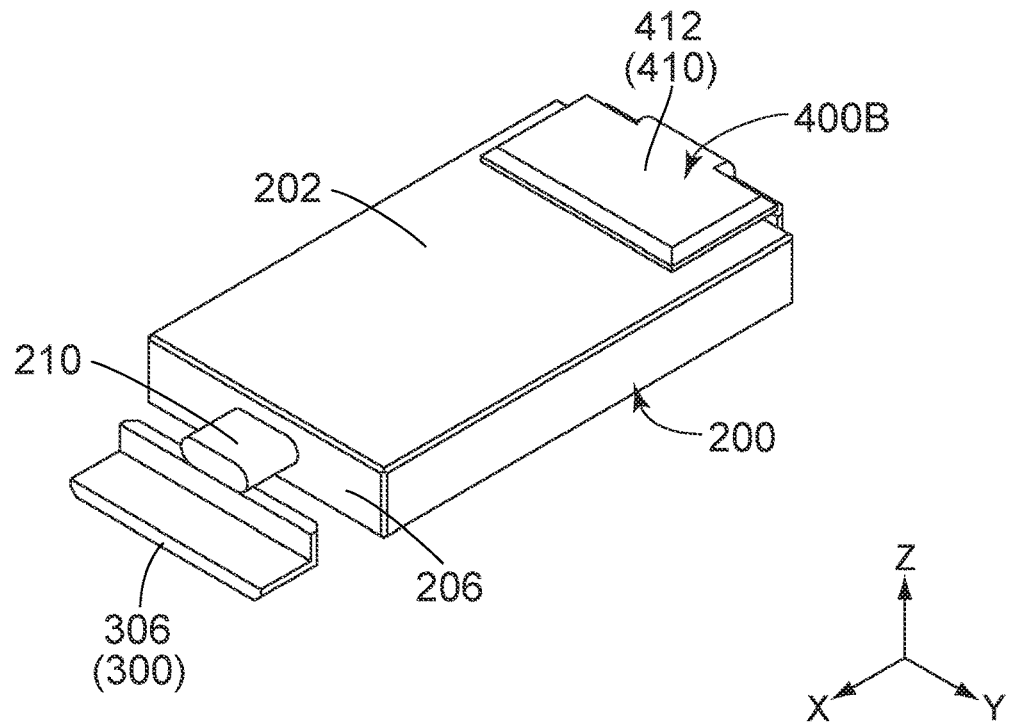
FIG. 20 is an upper, perspective view showing a structure of the solid electrolytic capacitor of FIG. 15, excluding an outer mold.

As shown in FIGS. 15 and 16, a solid electrolytic capacitor 100B according to a third embodiment of the present invention has an upper surface 102 and a lower surface 104 in the up-down direction. The solid electrolytic capacitor 100B has a front surface 106 and a rear surface 108B in the front-rear direction perpendicular to the up-down direction. As shown in FIGS. 15 and 20, the solid electrolytic capacitor 100B comprises a capacitor element 200, an outer anode terminal 300, an outer cathode terminal 400B and an outer mold 600B. The solid electrolytic capacitor 100B has a structure similar to that of the solid electrolytic capacitor 100 of the first embodiment except for the outer cathode terminal 400B and the outer mold 600B. Accordingly, components similar to those of the first embodiment among components of the third embodiment will be designated by the same reference numerals as those of the first embodiment, and a detail explanation thereabout will be omitted. As for directions and orientations in the present embodiment, expressions same as those of the first embodiment will be used hereinbelow.

As shown in FIG. 16, a lower surface 304 of the outer anode terminal 300 is exposed to the outside of the solid electrolytic capacitor 100B. The lower surface 304 of the outer anode terminal 300 is exposed on the lower surface 104 of the solid electrolytic capacitor 100B. In other words, the lower surface 304 of the outer anode terminal 300 is not covered with the outer mold 600B. As shown in FIG. 15, a front surface 306 of the outer anode terminal 300 is exposed to the outside of the solid electrolytic capacitor 100B. The front surface 306 of the outer anode terminal 300 is exposed on the front surface 106 of the solid electrolytic capacitor 100B. In other words, the front surface 306 of the outer anode terminal 300 is not covered with the outer mold 600B. It is noted that the outer anode terminal 300 is not exposed on the upper surface 102 of the solid electrolytic capacitor 100B.

Figure 21:
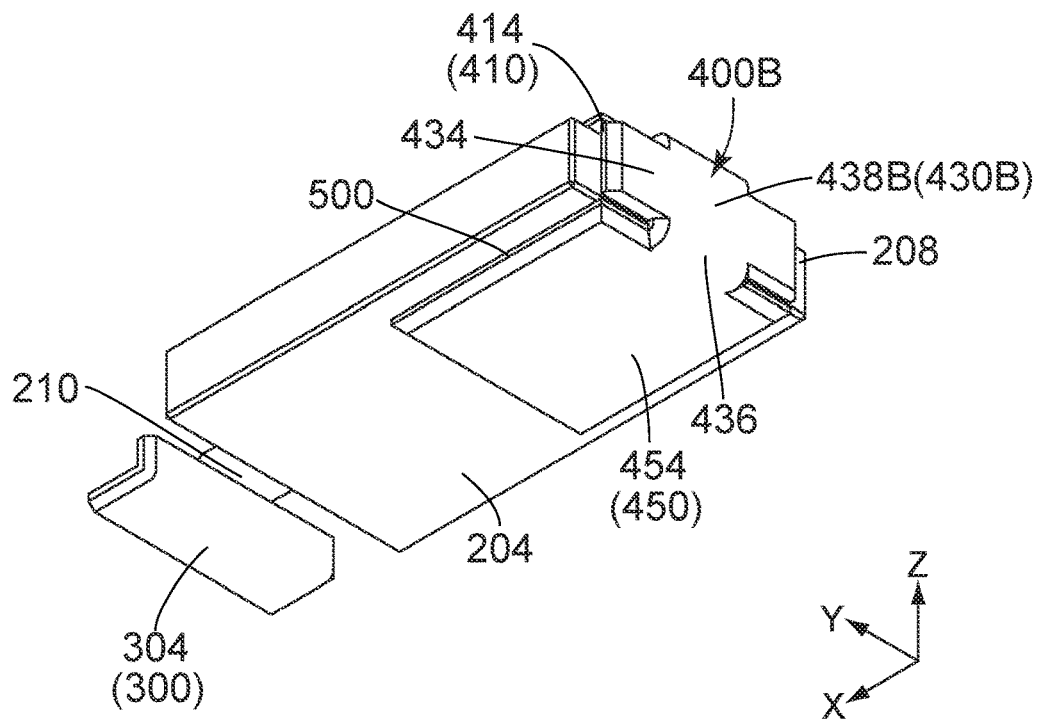
FIG. 21 is a lower, perspective view showing the structure of FIG. 20.
Figure 22:
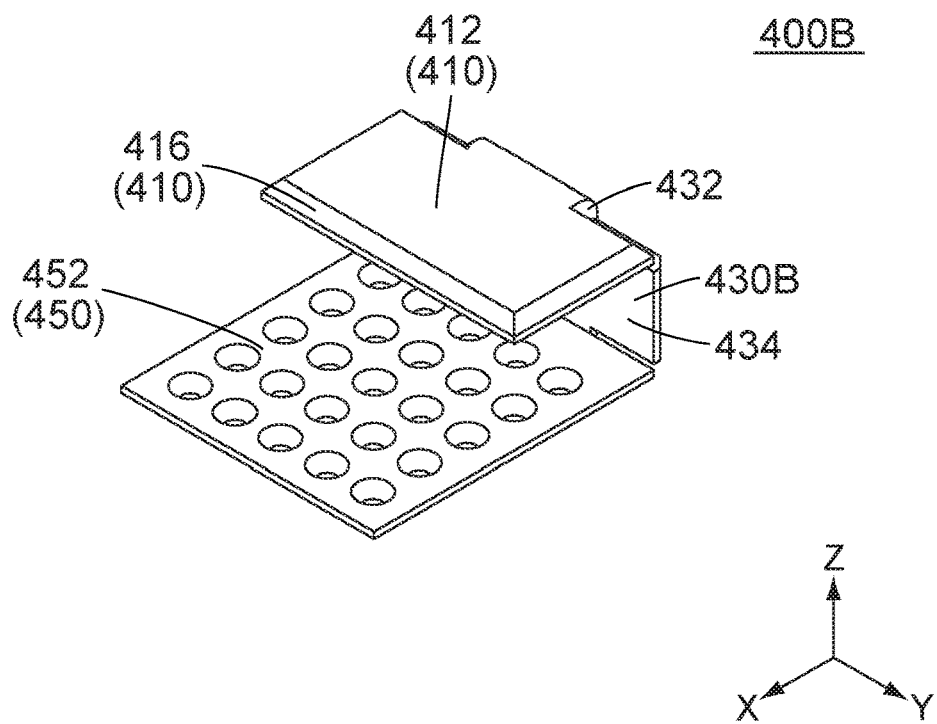
FIG. 22 is an upper, perspective view showing an outer cathode terminal which is included in the structure of FIG. 20.

Referring to FIG. 22, the outer cathode terminal 400B of the present embodiment is made of metal. The outer cathode terminal 400B is connected with a cathode layer (not shown). As shown in FIG. 21, the outer cathode terminal 400B and the outer anode terminal 300 are positioned away from each other in the predetermined direction perpendicular to the up-down direction.

As shown in FIG. 21, parts of rear corner portions of the capacitor element 200 are coved with the outer cathode terminal 400B. An upper end of a rear surface 208 of the capacitor element 200 is positioned inward of the outer cathode terminal 400B in a plane perpendicular to the width direction. A lower end of the rear surface 208 of the capacitor element 200 is positioned inward of the outer cathode terminal 400B in the plane perpendicular to the width direction.

In general, a conventional solid electrolytic capacitor may be molded by resin together with other electrical components after the solid electrolytic capacitor is mounted on a circuit board. Such a conventional solid electrolytic capacitor is protected by an outer mold. However, in such a conventional solid electrolytic capacitor, there is a probability that external force, which is generated when the resin is hardened for the molding of the conventional solid electrolytic capacitor, is applied to a capacitor element, in particular to its corner portions and thereby the capacitor element is degraded. In contrast, the solid electrolytic capacitor 100B of the present embodiment is, as described above, configured so that the parts of the rear corner portions of the capacitor element 200 are coved with the outer cathode terminal 400B made of metal. Thus, the solid electrolytic capacitor 100B of the present embodiment is configured so that the rear corner portions of the capacitor element 200 are protected from external force which is generated when resin is hardened for molding of the solid electrolytic capacitor 100B similar to the aforementioned molding.

Figure 23:
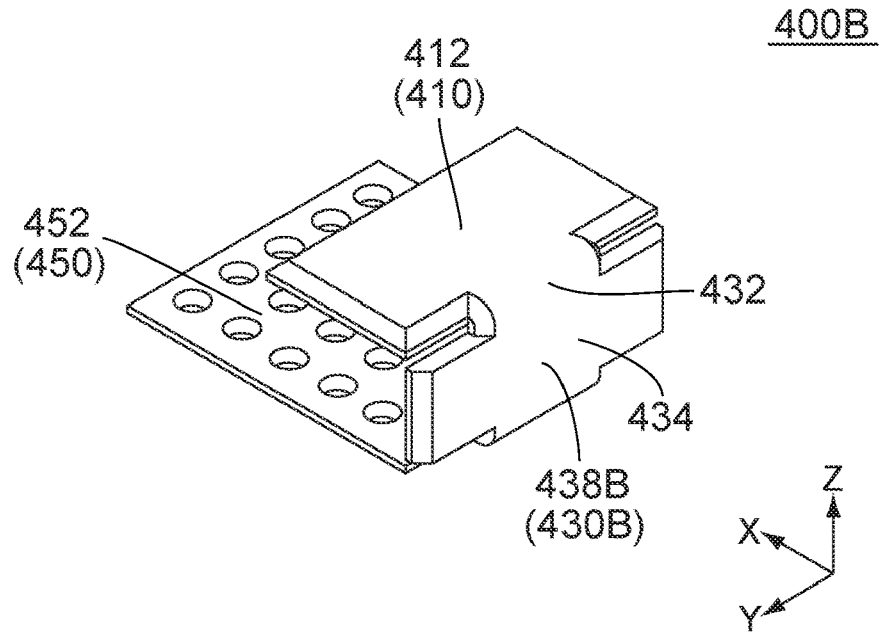
FIG. 23 is another upper, perspective view showing the outer cathode terminal of FIG. 22.

As shown in FIG. 23, the outer cathode terminal 400B has an upper portion 410, a lower portion 450 and a connecting portion 430B. Components other than the connecting portion 430B among the aforementioned components of the outer cathode terminal 400B of the present embodiment have structures same as those of the outer cathode terminal 400 of the aforementioned first embodiment. Accordingly, a detail explanation thereabout will be omitted.

As understood from FIGS. 15 and 20, the upper portion 410 of the outer cathode terminal 400B covers an upper surface 202 of the capacitor element 200. An upper surface 412 of the upper portion 410 is exposed to the outside of the solid electrolytic capacitor 100B. The upper surface 412 of the upper portion 410 is exposed on the upper surface 102 of the solid electrolytic capacitor 100B. In other words, the upper surface 412 of the upper portion 410 is not covered with the outer mold 600B. However, the present invention is not limited thereto. The upper surface 412 of the upper portion 410 may not be exposed to the outside of the solid electrolytic capacitor 100B. In other words, the upper surface 412 of the upper portion 410 may be covered with the outer mold 600B. However, the solid electrolytic capacitor 100B of the present embodiment is superior in that the upper surface 412 of the upper portion 410 is highly visible from the outside of the solid electrolytic capacitor 100B. Thus, the solid electrolytic capacitor 100B of the present embodiment is more preferred.

As described above, the outer anode terminal 300 is not exposed on the upper surface 102 of the solid electrolytic capacitor 100B while the upper surface 412 of the upper portion 410 of the outer cathode terminal 400B is exposed to the outside of the solid electrolytic capacitor 100B. In other words, conditions of exposure of the outer anode terminal 300 and the outer cathode terminal 400B from the outer mold 600B are different from each other. This facilitates identifications of the outer anode terminal 300 and the outer cathode terminal 400B from the outside of the solid electrolytic capacitor 100B.

As understood from in FIGS. 16 and 21, the lower portion 450 of the outer cathode terminal 400B covers a lower surface 204 of the capacitor element 200. A lower surface 454 of the lower portion 450 is exposed to the outside of the solid electrolytic capacitor 100B. The lower surface 454 of the lower portion 450 is exposed on the lower surface 104 of the solid electrolytic capacitor 100B. In other words, the lower surface 454 of the lower portion 450 is not covered with the outer mold 600B.

Figure 24:
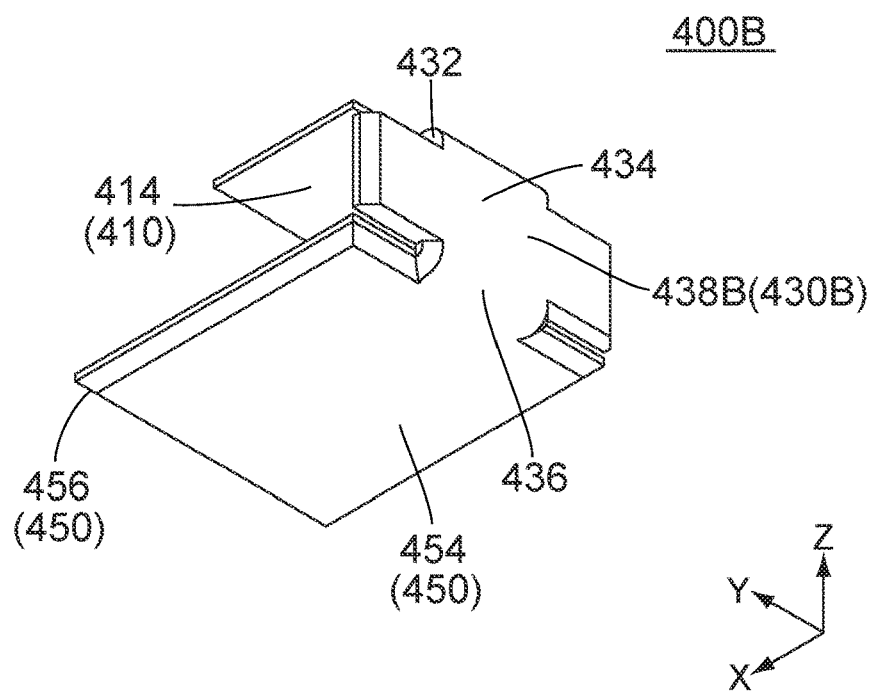
FIG. 24 is a lower, perspective view showing the outer cathode terminal of FIG. 22.

As shown in FIG. 24, the connecting portion 430B of the present embodiment extends in the up-down direction. The connecting portion 430B connects the upper portion 410 and the lower portion 450 with each other. Specifically, the connecting portion 430B connects the upper portion 410 and the lower portion 450 with each other in the up-down direction. The connecting portion 430B has a first connecting element 432, a connecting main portion 434 and a second connecting element 436.

As shown in FIG. 23, the first connecting element 432 of the present embodiment connects the upper portion 410 and the connecting main portion 434 with each other. The first connecting element 432 has a size smaller than a size of any of the upper portion 410 and the lower portion 450 in the width direction perpendicular to both the up-down direction and the predetermined direction. This facilitates bending of the first connecting element 432.

As shown in FIG. 24, the connecting main portion 434 of the present embodiment has a flat plate shape perpendicular to the front-rear direction. The connecting main portion 434 connects the first connecting element 432 and the second connecting element 436 with each other. The connecting main portion 434 has a size same as a size of the upper portion 410 in the width direction. The connecting main portion 434 has a size same as a size of the lower portion 450 in the width direction. However, the present invention is not limited thereto. Specifically, the connecting main portion 434 may have a size different from the size of the upper portion 410 in the width direction. Similarly, the connecting main portion 434 may have a size different from the size of the lower portion 450 in the width direction.

The solid electrolytic capacitor 100B of the present embodiment is configured so that the connecting portion 430B has the connecting main portion 434 which has an increased size in the width direction. Accordingly, as compared to the solid electrolytic capacitor 100 of the first embodiment, the solid electrolytic capacitor 100B of the present embodiment is configured so that the rear surface 208 of the capacitor element 200 is largely covered with the connecting main portion 434 of the outer cathode terminal 400B made of metal. Thus, the solid electrolytic capacitor 100B of the present embodiment is configured so that the rear surface 208 and its surrounding portions of the capacitor element 200 are more protected from the external force which is generated when the resin is hardened for the molding of the solid electrolytic capacitor 100B similar to the aforementioned molding.

As shown in FIG. 24, the second connecting element 436 of the present embodiment connects the connecting main portion 434 and the lower portion 450 with each other. The second connecting element 436 has a size smaller than the size of any of the upper portion 410 and the lower portion 450 in the width direction perpendicular to both the up-down direction and the predetermined direction. This facilitates bending of the second connecting element 436.

As shown in FIG. 21, the rear surface 208 of the capacitor element 200 is positioned forward of the connecting portion 430B in the front-rear direction. The rear surface 208 of the capacitor element 200 is positioned forward of the connecting main portion 434 in the front-rear direction. The connecting portion 430B covers the rear surface 208 of the capacitor element 200.

Figure 19:
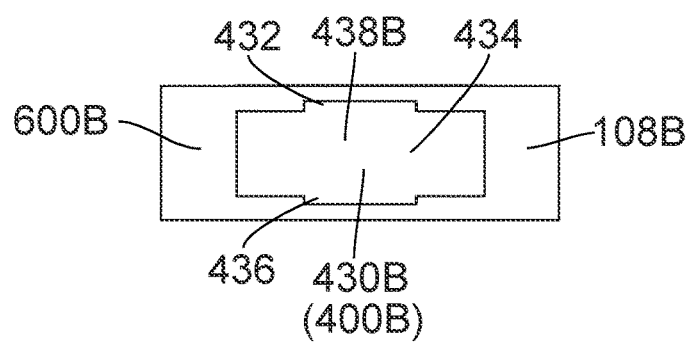
FIG. 19 is a rear view showing the solid electrolytic capacitor of FIG. 15.
Figure 19:
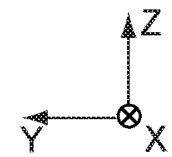

As shown in FIG. 19, a part of a rear surface 438B of the connecting portion 430B is exposed to the outside of the solid electrolytic capacitor 100B. Specifically, the part of the rear surface 438B of the connecting portion 430B is exposed on the rear surface 108B of the solid electrolytic capacitor 100B. In other words, the part of the rear surface 438B of the connecting portion 430B is not covered with the outer mold 600B.

In general, ripple current flows through a solid electrolytic capacitor when ripple voltage is applied to the solid electrolytic capacitor upon usage of the solid electrolytic capacitor. This causes a capacitor element, which is included in the solid electrolytic capacitor, to generate heat. The generated heat might cause degradation of characteristics of the capacitor element included therein and might affect reliability of the solid electrolytic capacitor. Accordingly, temperature rise of a capacitor element, which is caused by its heat generation due to ripple current, must be reduced in a solid electrolytic capacitor. In the solid electrolytic capacitor 100B of the present embodiment, the part of the rear surface 438B of the connecting portion 430B is exposed to the outside of the solid electrolytic capacitor 100B as described above. This enables the solid electrolytic capacitor 100B of the present embodiment to provide increased heat dissipation as compared to a conventional solid electrolytic capacitor (for example, the solid electrolytic capacitor 800 shown in FIG. 28) whose outer cathode terminal is hardly exposed to the outside of its outer mold. Thus, in the solid electrolytic capacitor 100B of the present embodiment, temperature rise of the capacitor element 200, which is caused by its heat generation due to ripple current, is reduced and has little effect on reliability of the solid electrolytic capacitor 100B.

In particular, the solid electrolytic capacitor 100B of the present embodiment is, as described above, configured as follows: the upper portion 410 covers the upper surface 202 of the capacitor element 200; the lower portion 450 covers the lower surface 204 of the capacitor element 200; the connecting portion 430B covers the rear surface 208 of the capacitor element 200; and each of the upper surface 412 of the upper portion 410, the lower surface 454 of the lower portion 450 and the part of the rear surface 438B of the connecting portion 430B is exposed to the outside of the solid electrolytic capacitor 100B. A conventional solid electrolytic capacitor is configured so that an outer cathode terminal with a flat plate shape coves only a lower surface of a capacitor element while only a lower surface of the outer cathode terminal is exposed to the outside of the conventional solid electrolytic capacitor. In contrast, as compared to such a conventional solid electrolytic capacitor, the solid electrolytic capacitor 100B of the present embodiment is configured so that the outer cathode terminal 400B has a large area covering the capacitor element 200 while each of the upper surface 412 of the upper portion 410 and the part of the rear surface 438B of the connecting portion 430B is exposed to the outside of the solid electrolytic capacitor 100 in addition to the exposure of the lower surface 454 thereto. This enables the solid electrolytic capacitor 100B of the present embodiment to provide further increased heat dissipation as compared to a conventional solid electrolytic capacitor. Thus, in the solid electrolytic capacitor 100B of the present embodiment, the temperature rise of the capacitor element 200, which is caused by its heat generation due to ripple current, is further reduced and has still little effect on the reliability of the solid electrolytic capacitor 100B.

As shown in FIGS. 15 and 16, the outer mold 600B of the present embodiment covers the capacitor element 200 so that each of the outer anode terminal 300 and the outer cathode terminal 400B is partially exposed to the outside of the solid electrolytic capacitor 100B.

Fourth Embodiment

Figure 25:
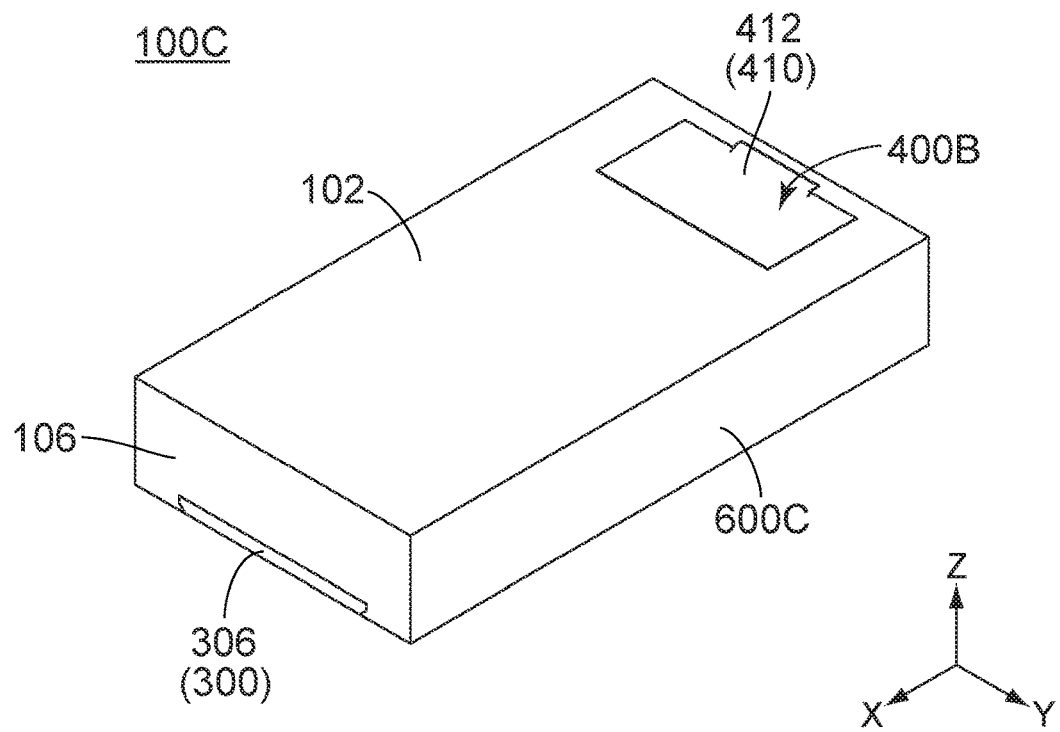
FIG. 25 is an upper, perspective view showing a solid electrolytic capacitor according to a fourth embodiment of the present invention.
Figure 26:
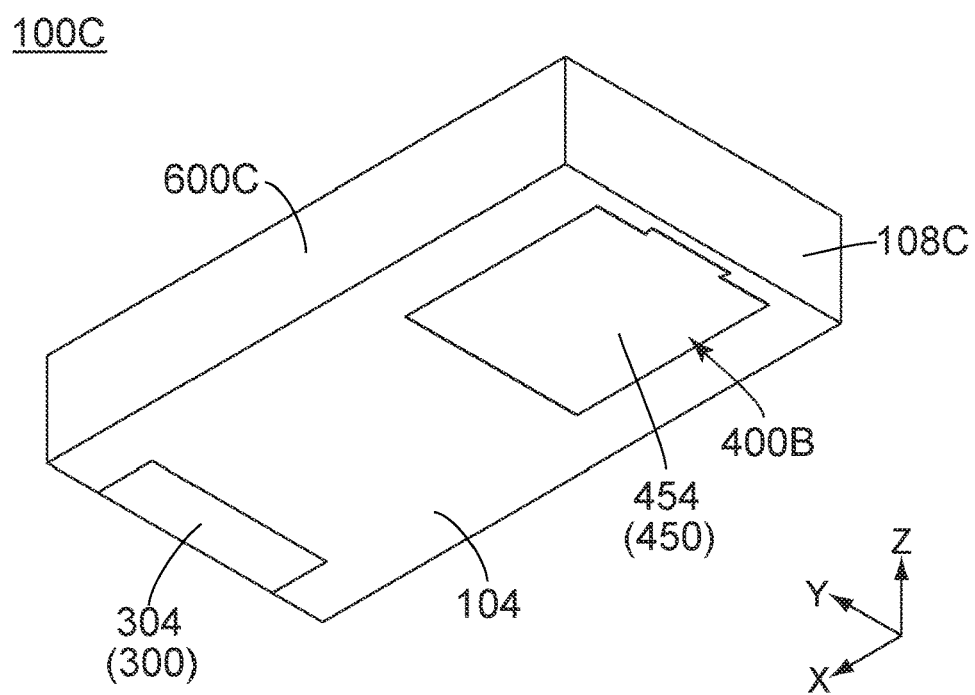
FIG. 26 is a lower, perspective view showing the solid electrolytic capacitor of FIG. 25.

As shown in FIGS. 25 and 26, a solid electrolytic capacitor 100C according to a fourth embodiment of the present invention has an upper surface 102 and a lower surface 104 in the up-down direction. The solid electrolytic capacitor 100C has a front surface 106 and a rear surface 108C in the front-rear direction perpendicular to the up-down direction. The solid electrolytic capacitor 100C comprises a capacitor element (not shown), an outer anode terminal 300, an outer cathode terminal 400B and an outer mold 600C. The solid electrolytic capacitor 100C has a structure similar to that of the solid electrolytic capacitor 100B of the third embodiment except for the outer mold 600C. Accordingly, components similar to those of the third embodiment among components of the fourth embodiment will be designated by the same reference numerals as those of the third embodiment, and a detail explanation thereabout will be omitted. As for directions and orientations in the present embodiment, expressions same as those of the first embodiment will be used hereinbelow.

As shown in FIG. 26, a lower surface 304 of the outer anode terminal 300 is exposed to the outside of the solid electrolytic capacitor 100C. The lower surface 304 of the outer anode terminal 300 is exposed on the lower surface 104 of the solid electrolytic capacitor 100C. In other words, the lower surface 304 of the outer anode terminal 300 is not covered with the outer mold 600C. As shown in FIG. 25, a front surface 306 of the outer anode terminal 300 is exposed to the outside of the solid electrolytic capacitor 100C. The front surface 306 of the outer anode terminal 300 is exposed on the front surface 106 of the solid electrolytic capacitor 100C. In other words, the front surface 306 of the outer anode terminal 300 is not covered with the outer mold 600C. It is noted that the outer anode terminal 300 is not exposed on the upper surface 102 of the solid electrolytic capacitor 100C.

Figure 27:
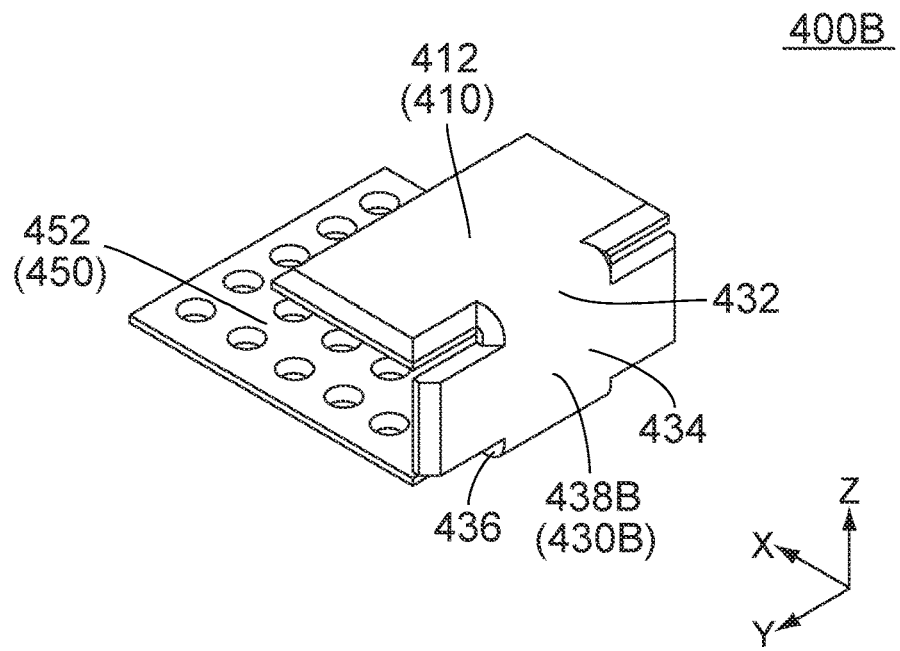
FIG. 27 is an upper, perspective view showing an outer cathode terminal which is included in the solid electrolytic capacitor of FIG. 25.

Referring to FIG. 27, the outer cathode terminal 400B of the present embodiment is made of metal. The outer cathode terminal 400B is connected with a cathode layer (not shown). Referring to FIGS. 21 and 26, the outer cathode terminal 400B and the outer anode terminal 300 are positioned away from each other in the predetermined direction perpendicular to the up-down direction.

Referring to FIGS. 21, 25 and 26, parts of rear corner portions of the capacitor element are coved with the outer cathode terminal 400B. An upper end of a rear surface (not shown) of the capacitor element is positioned inward of the outer cathode terminal 400B in a plane perpendicular to the width direction. A lower end of the rear surface of the capacitor element is positioned inward of the outer cathode terminal 400B in the plane perpendicular to the width direction.

In general, a conventional solid electrolytic capacitor may be molded by resin together with other electrical components after the solid electrolytic capacitor is mounted on a circuit board. Such a conventional solid electrolytic capacitor is protected by an outer mold. However, in such a conventional solid electrolytic capacitor, there is a probability that external force, which is generated when the resin is hardened for the molding of the conventional solid electrolytic capacitor, is applied to a capacitor element, in particular to its corner portions and thereby the capacitor element is degraded. In contrast, the solid electrolytic capacitor 100C of the present embodiment is, as described above, configured so that the parts of the rear corner portions of the capacitor element are coved with the outer cathode terminal 400B made of metal. Thus, the solid electrolytic capacitor 100C of the present embodiment is configured so that the rear corner portions of the capacitor element are protected from external force which is generated when resin is hardened for molding of the solid electrolytic capacitor 100C similar to the aforementioned molding.

As shown in FIG. 27, the outer cathode terminal 400B has an upper portion 410, a lower portion 450 and a connecting portion 430B. Components other than the connecting portion 430B among the aforementioned components of the outer cathode terminal 400B of the present embodiment have structures same as those of the outer cathode terminal 400 of the aforementioned first embodiment. Accordingly, a detail explanation thereabout will be omitted.

Referring to FIGS. 20 and 25, the upper portion 410 of the outer cathode terminal 400B covers an upper surface (not shown) of the capacitor element. An upper surface 412 of the upper portion 410 is exposed to the outside of the solid electrolytic capacitor 100C. The upper surface 412 of the upper portion 410 is exposed on the upper surface 102 of the solid electrolytic capacitor 100C. In other words, the upper surface 412 of the upper portion 410 is not covered with the outer mold 600C. However, the present invention is not limited thereto. The upper surface 412 of the upper portion 410 may not be exposed to the outside of the solid electrolytic capacitor 100C. In other words, the upper surface 412 of the upper portion 410 may be covered with the outer mold 600C. However, the solid electrolytic capacitor 100C of the present embodiment is superior in that the upper surface 412 of the upper portion 410 is highly visible from the outside of the solid electrolytic capacitor 100C. Thus, the solid electrolytic capacitor 100C of the present embodiment is more preferred.

As described above, the outer anode terminal 300 is not exposed on the upper surface 102 of the solid electrolytic capacitor 100C while the upper surface 412 of the upper portion 410 of the outer cathode terminal 400B is exposed to the outside of the solid electrolytic capacitor 100C. In other words, conditions of exposure of the outer anode terminal 300 and the outer cathode terminal 400B from the outer mold 600C are different from each other. This facilitates identifications of the outer anode terminal 300 and the outer cathode terminal 400B from the outside of the solid electrolytic capacitor 100C.

Referring to FIGS. 21 and 26, the lower portion 450 of the outer cathode terminal 400B covers a lower surface (not shown) of the capacitor element. A lower surface 454 of the lower portion 450 is exposed to the outside of the solid electrolytic capacitor 100C. The lower surface 454 of the lower portion 450 is exposed on the lower surface 104 of the solid electrolytic capacitor 100C. In other words, the lower surface 454 of the lower portion 450 is not covered with the outer mold 600C.

As shown in FIG. 27, the connecting portion 430B of the present embodiment extends in the up-down direction. The connecting portion 430B connects the upper portion 410 and the lower portion 450 with each other. Specifically, the connecting portion 430B connects the upper portion 410 and the lower portion 450 with each other in the up-down direction. The connecting portion 430B has a first connecting element 432, a connecting main portion 434 and a second connecting element 436.

As shown in FIG. 27, the first connecting element 432 of the present embodiment connects the upper portion 410 and the connecting main portion 434 with each other. The first connecting element 432 has a size smaller than a size of any of the upper portion 410 and the lower portion 450 in the width direction perpendicular to both the up-down direction and the predetermined direction. This facilitates bending of the first connecting element 432.

As shown in FIG. 27, the connecting main portion 434 of the present embodiment has a flat plate shape perpendicular to the front-rear direction. The connecting main portion 434 connects the first connecting element 432 and the second connecting element 436 with each other. The connecting main portion 434 has a size same as a size of the upper portion 410 in the width direction. The connecting main portion 434 has a size same as a size of the lower portion 450 in the width direction. However, the present invention is not limited thereto. Specifically, the connecting main portion 434 may have a size different from the size of the upper portion 410 in the width direction. Similarly, the connecting main portion 434 may have a size different from the size of the lower portion 450 in the width direction.

The solid electrolytic capacitor 100C of the present embodiment is configured so that the connecting portion 430B has the connecting main portion 434 which has an increased size in the width direction. Thus, as compared to the solid electrolytic capacitor 100 of the first embodiment, the solid electrolytic capacitor 100C of the present embodiment is configured so that the rear surface of the capacitor element is largely covered with the connecting main portion 434 of the outer cathode terminal 400B made of metal. Thus, the solid electrolytic capacitor 100C of the present embodiment is configured so that the rear surface and its surrounding portions of the capacitor element are more protected from the external force which is generated when the resin is hardened for the molding of the solid electrolytic capacitor 100C similar to the aforementioned molding.

As shown in FIG. 27, the second connecting element 436 of the present embodiment connects the connecting main portion 434 and the lower portion 450 with each other. The second connecting element 436 has a size smaller than a size of any of the upper portion 410 and the lower portion 450 in the width direction perpendicular to both the up-down direction and the predetermined direction. This facilitates bending of the second connecting element 436.

Referring to FIGS. 21 and 27, the rear surface of the capacitor element is positioned forward of the connecting portion 430B in the front-rear direction. The rear surface of the capacitor element is positioned forward of the connecting main portion 434 in the front-rear direction.

Referring to FIGS. 21 and 26, the connecting portion 430B covers the rear surface of the capacitor element. A rear surface 438B of the connecting portion 430B is not exposed to the outside of the solid electrolytic capacitor 100C. The rear surface 438B of the connecting portion 430B is not exposed on the rear surface 108C of the solid electrolytic capacitor 100C. Specifically, the rear surface 438B of the connecting portion 430B is thinly covered with the outer mold 600C. However, the present invention is not limited thereto. Specifically, the rear surface 438B of the connecting portion 430B may be partially exposed to the outside of the solid electrolytic capacitor 100C. More specifically, the rear surface 438B of the connecting portion 430B may be partially exposed on the rear surface 108C of the solid electrolytic capacitor 100C. In other words, the rear surface 438B of the connecting portion 430B may not be partially covered with the outer mold 600C.

The solid electrolytic capacitor 100C of the present embodiment is, as described above, configured as follows: the upper portion 410 covers the upper surface of the capacitor element; the lower portion 450 covers the lower surface of the capacitor element; the connecting portion 430B covers the rear surface of the capacitor element; and each of the upper surface 412 of the upper portion 410 and the lower surface 454 of the lower portion 450 is exposed to the outside of the solid electrolytic capacitor 100C. A conventional solid electrolytic capacitor is configured so that an outer cathode terminal with a flat plate shape coves only a lower surface of a capacitor element while only a lower surface of the outer cathode terminal is exposed to the outside of the conventional solid electrolytic capacitor. In contrast, as compared to such a conventional solid electrolytic capacitor, the solid electrolytic capacitor 100C of the present embodiment is configured so that the outer cathode terminal 400B has a large area covering the capacitor element while the upper surface 412 of the upper portion 410 is exposed to the outside of the solid electrolytic capacitor 100C in addition to the exposure of the lower surface 454 thereto. This enables the solid electrolytic capacitor 100C of the present embodiment to provide further increased heat dissipation as compared to such a conventional solid electrolytic capacitor. Thus, in the solid electrolytic capacitor 100C of the present embodiment, temperature rise of the capacitor element, which is caused by its heat generation due to ripple current, is reduced and has little effect on reliability of the solid electrolytic capacitor 100C.

Referring to FIGS. 20, 25 and 26, the outer mold 600C of the present embodiment covers the capacitor element so that each of the outer anode terminal 300 and the outer cathode terminal 400B is partially exposed to the outside of the solid electrolytic capacitor 100C.

Hereafter, a detailed explanation is made about Examples and Comparative Example.

[Measurement of Ratio of Values of Temperature Rises]

Figure 28:
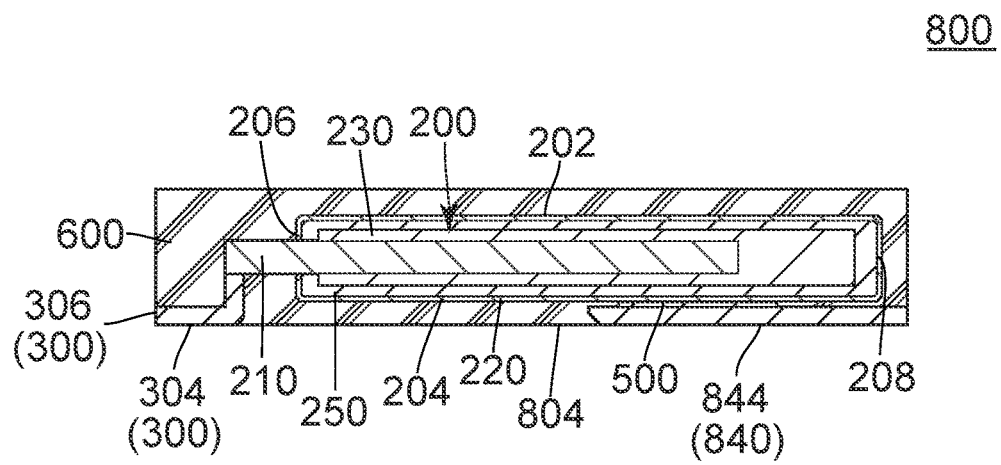
FIG. 28 is a cross-sectional view showing a solid electrolytic capacitor of Comparative Example.
Figure 29:
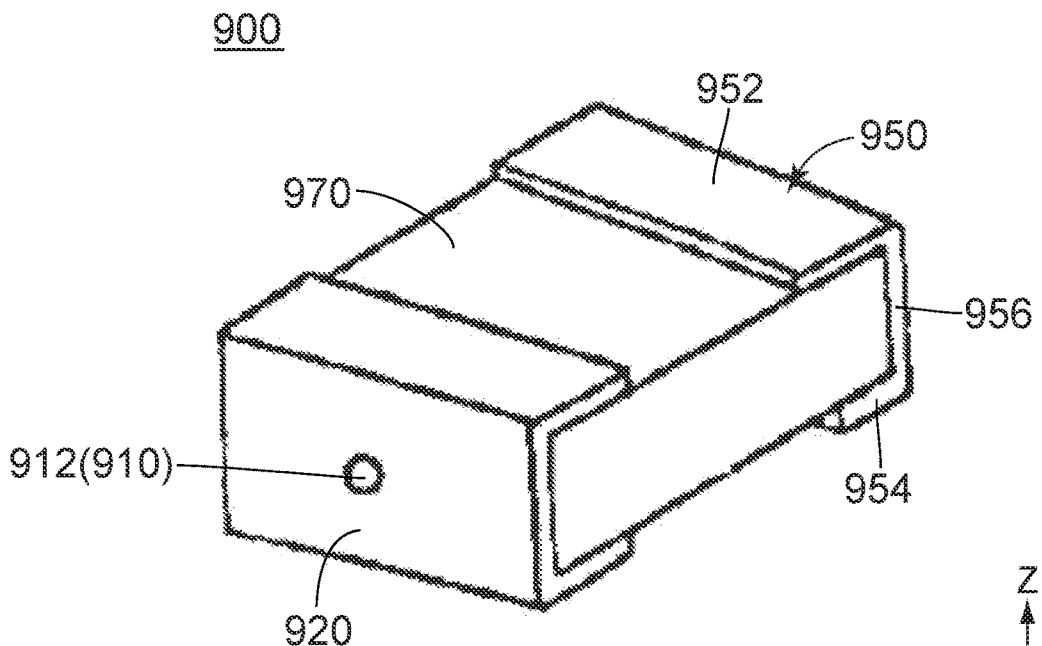
FIG. 29 is a perspective view showing a solid electrolytic capacitor of Patent Document 1.
Figure 30:
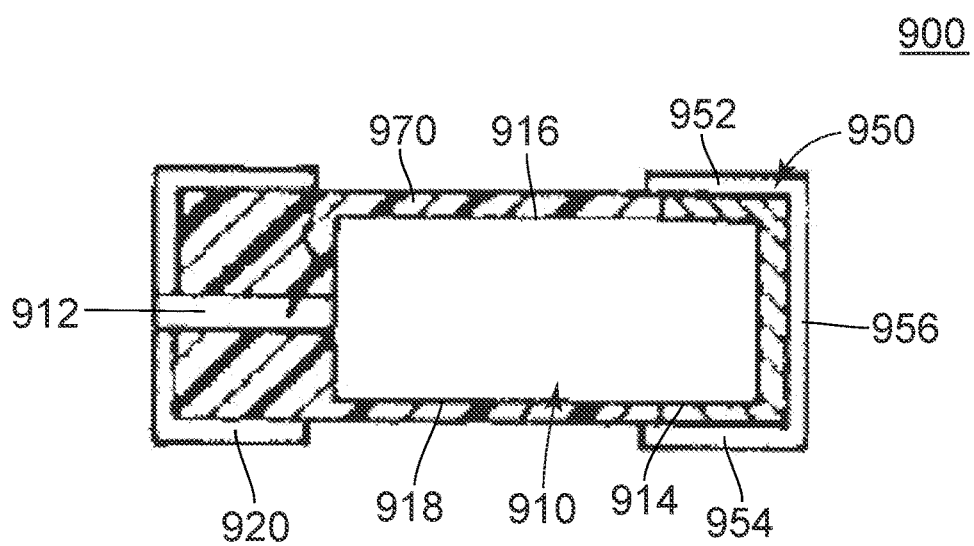
FIG. 30 is a cross-sectional view showing the solid electrolytic capacitor of FIG. 29.

Values of temperature rises of three samples, namely, a solid electrolytic capacitor 100 of Example 1, a solid electrolytic capacitor 100A of Example 2 and the solid electrolytic capacitor 800 of Comparative Example, due to heat generation of the capacitor element 200, through which ripple current flows, were measured. The Example 1 corresponds to the first embodiment, and the Example 2 corresponds to the second embodiment. As shown in FIG. 28, the solid electrolytic capacitor 800 of the Comparative Example comprises a capacitor element 200, an outer anode terminal 300, an outer cathode terminal 840 and an outer mold 600.

Specifically, the solid electrolytic capacitor 800 has a structure similar to that of the solid electrolytic capacitor 100 of the first embodiment except for the outer cathode terminal 840. Accordingly, components similar to those of the first embodiment among components of the solid electrolytic capacitor 800 shown in FIG. 28 will be designated by the same reference numerals as those of the first embodiment. Specifically, the outer cathode terminal 840 of the solid electrolytic capacitor 800 of the Comparative Example has a flat plate shape perpendicular to the up-down direction, and a lower surface 844 of the outer cathode terminal 840 is exposed to the outside of the solid electrolytic capacitor 800. The lower surface 844 of the outer cathode terminal 840 is exposed on a lower surface 804 of the solid electrolytic capacitor 800. In other words, the lower surface 844 of the outer cathode terminal 840 is not covered with the outer mold 600. Table 1 shows measured values of temperature rises of the Example 1, the Example 2 and the Comparative Example.

TABLE 1

|  | temperature rise (° C.) | | ratio relative to Comparative Example | |
| --- | --- | --- | --- | --- |
| ripple current (mArms) | 1000 | 2000 | 1000 | 2000 |
| Example 1 | 3.68 | 15.35 | 0.44 | 0.35 |
| Example 2 | 5.26 | 25.58 | 0.62 | 0.59 |
| Comparative Example | 8.44 | 43.58 | 1.00 | 1.00 |

As shown in Table 1, when the ripple current is 1000 mArms, the ratio of the value of the temperature rise of the Example 1 relative to the value of the temperature rise of the Comparative Example is 0.44. As shown in Table 1, when the ripple current is 2000 mArms, the ratio of the value of the temperature rise of the Example 1 relative to the value of the temperature rise of the Comparative Example is 0.35. As shown in Table 1, when the ripple current is 1000 mArms, the ratio of the value of the temperature rise of the Example 2 relative to the value of the temperature rise of the Comparative Example is 0.62. As shown in Table 1, when the ripple current is 2000 mArms, the ratio of the value of the temperature rise of the Example 2 relative to the value of the temperature rise of the Comparative Example is 0.59.

As described above, the solid electrolytic capacitor 100 of the first embodiment, which corresponds to the Example 1, is configured so that each of the upper surface 412 of the upper portion 410, the lower surface 454 of the lower portion 450 and the part of the rear surface 438 of the connecting portion 430 is exposed to the outside of the solid electrolytic capacitor 100. In addition, as described above, the solid electrolytic capacitor 100A of the second embodiment, which corresponds to the Example 2, is configured so that each of the upper surface 412 of the upper portion 410 and the rear surface 438 of the connecting portion 430 is thinly covered with the outer mold 600A while the lower surface 454 of the lower portion 450 is exposed to the outside of the solid electrolytic capacitor 100A. These measurement results support the following: the Example 1 has greater heat dissipation capacity than any of those of the Example 2 and the Comparative Example. Additionally, the measurement results support the following: the Example 2 has greater heat dissipation capacity than that of the Comparative Example, although not as great as that of the Example 1.

[Calculation of Ratio R of Leakage Current Values]

Leakage currents $I_s$ of three samples, namely, Example 1, Example 3 and Comparative Example, were measured. In addition, leakage currents $I_r$ of another three samples, namely, References 1, Reference 3 and Comparative Reference, were measured. The measurement conditions were as follows: voltage applied to each of the samples is 16 V; and charging time is 300 seconds. The Example 1 corresponds to the aforementioned first embodiment. The Reference 1 has a structure of the solid electrolytic capacitor 100 of the aforementioned first embodiment prior to molding of the outer mold 600. In other words, the Reference 1 has the structure of the solid electrolytic capacitor 100 of the aforementioned first embodiment which excludes the outer mold 600. The Example 3 corresponds to the aforementioned third embodiment. The Reference 3 has a structure of the solid electrolytic capacitor 100B of the aforementioned third embodiment prior to molding of the outer mold 600B. In other words, the Reference 3 has the structure of the solid electrolytic capacitor 100B of the aforementioned third embodiment which excludes the outer mold 600B. A solid electrolytic capacitor 800 of the Comparative Example has a structure same as that of the aforementioned Comparative Example. The Comparative Reference has a structure of the solid electrolytic capacitor 800 of the aforementioned Comparative Example prior to molding of the outer mold 600. In other words, the Comparative Reference has the structure of the solid electrolytic capacitor 800 of the aforementioned Comparative Example which excludes the outer mold 600. R (%) is calculated as follows: $R=I_S/I_r*100$, wherein: R is a ratio of leakage current values; $I_S$ is a measured leakage current value of the Example 1, the Example 3 or the Comparative Example; and $I_r$ is a measured leakage current value of the Reference 1, the Reference 3 or the Comparative Reference. Table 2 shows calculated ratios R of leakage current values.

TABLE 2

|  | R (%) |
| --- | --- |
| Example 1/Reference 1 | 1.25 |
| Example 3/Reference 3 | 1.22 |
| Comparative Example/Comparative Reference | 3.50 |

As understood from Table 2, the ratio R of the leakage current value of the Example 3 relative to the leakage current value of the Reference 3 is smaller than the ratio R of the leakage current value of the Example 1 relative to the leakage current value of the Reference 1, and the ratio R of the leakage current value of the Example 3 relative to the leakage current value of the Reference 3 is also smaller than the ratio R of the leakage current value of the Comparative Example relative to the leakage current value of the Comparative Reference. As described above, the solid electrolytic capacitor 100B of the third embodiment, which corresponds to the Example 3, is configured so that the parts of the rear corner portions of the capacitor element 200 are coved with the outer cathode terminal 400B while the rear surface 208 of the capacitor element 200 is largely covered with the connecting main portion 434 having the increased size in the width direction. These measurement results support the following: the solid electrolytic capacitor 100B of the third embodiment, which corresponds to the Example 3, is configured so that a part of the external force, which is generated when the resin is hardened to form the outer mold 600B for the molding of the capacitor element 200, is received by the outer cathode terminal 400B, in particular by the connecting main portion 434 having the increased size in the width direction, and thereby the rear corner portions, the rear surface 208 and its surrounding portions of the capacitor element 200 are more protected from the external force as compared to the solid electrolytic capacitor 100 of the Example 1 and the solid electrolytic capacitor 800 of the Comparative Example.

As understood from Table 2, the ratio R of the leakage current value of the Example 1 relative to the leakage current value of the Reference 1 is smaller than the ratio R of the leakage current value of the Comparative Example relative to the leakage current value of the Comparative Reference, although greater than the ratio R of the leakage current value of the Example 3 relative to the leakage current value of the Reference 3. As described above, the parts of the rear corner portions of the capacitor element 200 are coved with the outer cathode terminal 400. These measurement results support the following: the solid electrolytic capacitor 100 of the first embodiment, which corresponds to the Example 1, is configured so that a part of the external force, which is generated when the resin is hardened to form the outer mold 600 for the molding of the capacitor element 200, is received by the outer cathode terminal 400, and thereby the parts of the rear corner portions of the capacitor element 200 are protected from the external force as compared to the solid electrolytic capacitor 800 of the Comparative Example.

Although the specific explanation about the present invention is made above referring to the embodiments, the present invention is not limited thereto and is susceptible to various modifications and alternative forms.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A solid electrolytic capacitor comprising a capacitor element, an outer anode terminal, an outer cathode terminal and an outer mold, wherein:
   the capacitor element has an anode lead wire, an anode body and a cathode layer;
   the capacitor element has an upper surface and a lower surface in an up-down direction;
   the outer anode terminal is connected with the anode lead wire;
   the outer cathode terminal is connected with the cathode layer;
   the outer cathode terminal and the outer anode terminal are positioned away from each other in a predetermined direction perpendicular to the up-down direction;
   the outer cathode terminal has an upper portion, a lower portion and a connecting portion;
   the upper portion is positioned above the upper surface of the capacitor element in the up-down direction;
   the lower portion is positioned below the lower surface of the capacitor element in the up-down direction;
   the connecting portion connects the upper portion and the lower portion with each other;
   one of the upper portion and the lower portion is longer than a remaining one of the upper portion and the lower portion in the predetermined direction;
   the outer mold covers the capacitor element so that each of the outer anode terminal and the outer cathode terminal is partially exposed to an outside of the solid electrolytic capacitor;
   the upper portion has an upper surface and a lower surface in the up-down direction;
   the lower surface of the upper portion is larger than the upper surface of the upper portion;
   the lower portion has an upper surface and a lower surface in the up-down direction; and
   the upper surface of the lower portion is larger than the lower surface of the lower portion.

2. The solid electrolytic capacitor as recited in claim 1, wherein:
   the upper portion has an edge in the predetermined direction;
   the edge of the upper portion is, at least in part, oblique to the predetermined direction;
   the lower portion has an edge in the predetermined direction; and
   the edge of the lower portion is, at least in part, oblique to the predetermined direction.

3. The solid electrolytic capacitor as recited in claim 1, wherein the connecting portion has a size smaller than a size of any of the upper portion and the lower portion in a width direction perpendicular to both the up-down direction and the predetermined direction.

4. The solid electrolytic capacitor as recited in claim 1, wherein:
   the connecting portion has a first connecting element, a connecting main portion and a second connecting element;
   the first connecting element connects the upper portion and the connecting main portion with each other;
   the connecting main portion connects the first connecting element and the second connecting element with each other;
   the second connecting element connects the connecting main portion and the lower portion with each other;
   the first connecting element has a size smaller than a size of any of the upper portion and the lower portion in a width direction perpendicular to both the up-down direction and the predetermined direction; and
   the second connecting element has a size smaller than the size of any of the upper portion and the lower portion in the width direction.

5. The solid electrolytic capacitor as recited in claim 1, wherein the lower portion and the cathode layer are connected with each other by conductive adhesive.

6. The solid electrolytic capacitor as recited in claim 5, wherein the upper surface of the lower portion is formed with irregularities.

7. The solid electrolytic capacitor as recited in claim 1, wherein the anode lead wire is welded to the outer anode terminal by laser welding.

8. The solid electrolytic capacitor as recited in claim 1, wherein:
   the outer mold has an outer surface; and
   the anode lead wire is positioned away from the outer surface of the outer mold.

9. The solid electrolytic capacitor as recited in claim 1, wherein the outer anode terminal has an L-shaped cross-section in a plane which is defined by the up-down direction and the predetermined direction.

10. The solid electrolytic capacitor as recited in claim 1, wherein the anode lead wire is a flat wire.

11. A solid electrolytic capacitor comprising a capacitor element, an outer anode terminal, an outer cathode terminal and an outer mold, wherein:
    the capacitor element has an anode lead wire, an anode body and a cathode layer;

the capacitor element has an upper surface and a lower surface in an up-down direction;

the outer anode terminal is connected with the anode lead wire;

the outer cathode terminal is connected with the cathode layer;

the outer cathode terminal and the outer anode terminal are positioned away from each other in a predetermined direction perpendicular to the up-down direction;

the outer cathode terminal has an upper portion, a lower portion and a connecting portion;

the upper portion is positioned above the upper surface of the capacitor element in the up-down direction;

the lower portion is positioned below the lower surface of the capacitor element in the up-down direction;

the connecting portion connects the upper portion and the lower portion with each other;

one of the upper portion and the lower portion is longer than a remaining one of the upper portion and the lower portion in the predetermined direction;

the outer mold covers the capacitor element so that each of the outer anode terminal and the outer cathode terminal is partially exposed to an outside of the solid electrolytic capacitor;

the connecting portion has a first connecting element, a connecting main portion and a second connecting element;

the first connecting element connects the upper portion and the connecting main portion with each other;

the connecting main portion connects the first connecting element and the second connecting element with each other;

the second connecting element connects the connecting main portion and the lower portion with each other;

the first connecting element has a size smaller than a size of any of the upper portion and the lower portion in a width direction perpendicular to both the up-down direction and the predetermined direction; and the second connecting element has a size smaller than the size of any of the upper portion and the lower portion in the width direction.

12. The solid electrolytic capacitor as recited in claim 11, wherein the lower portion and the cathode layer are connected with each other by conductive adhesive.

13. The solid electrolytic capacitor as recited in claim 12, wherein:

the lower portion has an upper surface and a lower surface in the up-down direction; and the upper surface of the lower portion is formed with irregularities.

14. The solid electrolytic capacitor as recited in claim 11, wherein the anode lead wire is welded to the outer anode terminal by laser welding.

15. The solid electrolytic capacitor as recited in claim 11, wherein:

the outer mold has an outer surface; and the anode lead wire is positioned away from the outer surface of the outer mold.

16. The solid electrolytic capacitor as recited in claim 11, wherein the outer anode terminal has an L-shaped cross-section in a plane which is defined by the up-down direction and the predetermined direction.

17. The solid electrolytic capacitor as recited in claim 11, wherein the anode lead wire is a flat wire.

* * * * *